(12) United States Patent
Fukuda et al.

(10) Patent No.: US 7,022,426 B2
(45) Date of Patent: Apr. 4, 2006

(54) SOLID POLYMER FUEL CELL

(75) Inventors: Kaoru Fukuda, Saitama (JP); Keisuke Andou, Saitama (JP); Nobuhiro Saito, Saitama (JP); Masaaki Nanaumi, Saitama (JP); Junji Matsuo, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 398 days.

(21) Appl. No.: 09/956,828

(22) Filed: Sep. 21, 2001

(65) Prior Publication Data

US 2002/0064699 A1 May 30, 2002

(30) Foreign Application Priority Data

| Sep. 22, 2000 | (JP) | ............................. 2000-289077 |
| Sep. 22, 2000 | (JP) | ............................. 2000-289078 |
| Sep. 22, 2000 | (JP) | ............................. 2000-289079 |
| Sep. 22, 2000 | (JP) | ............................. 2000-289080 |

(51) Int. Cl.
*H01M 8/10* (2006.01)
*H01M 4/96* (2006.01)

(52) U.S. Cl. .............................. 429/33; 429/42; 429/44

(58) Field of Classification Search .................. 429/30, 429/33, 40, 42, 44
See application file for complete search history.

(56) References Cited

U.S. PATENT DOCUMENTS

| 5,453,332 | A * | 9/1995 | Sakairi et al. ................ 429/40 |
| 6,280,871 | B1 * | 8/2001 | Tosco et al. .................. 429/41 |
| 6,355,149 | B1 * | 3/2002 | Soczka-Guth et al. ...... 204/296 |
| 6,376,110 | B1 * | 4/2002 | Koschany .................... 429/13 |

* cited by examiner

*Primary Examiner*—Jonathan Crepeau
(74) *Attorney, Agent, or Firm*—Arent Fox PLLC

(57) ABSTRACT

A solid polymer fuel cell includes an electrolyte membrane having a polymer ion-exchange component, and an air electrode and a fuel electrode between which the electrolyte membrane is sandwiched. Each of the air electrode and the fuel electrode can be formed of a polymer ion-exchange component and a plurality of catalyst particles including a catalyst metal carried on surfaces of carbon black particles, and includes no third component. When a moistening for maintaining the electrolyte membrane in a wet state is carried out from both of the side of the air electrode and the side of the fuel electrode, the carbon black particles have a water-repellent property such that an amount A of water adsorbed under a saturated steam pressure at 60° C. is equal to or smaller than 80 cc/g, and a ratio Wp/Wc of a weight Wp of polymer ion-exchange component incorporated to a weight Wc of carbon black particles incorporated is set in a range of $0.4 \leq Wp/Wc \leq 1.25$.

4 Claims, 27 Drawing Sheets

SOLID POLYMER FUEL CELL

BACKGROUND OF THE INVENTION

1. Field of the Invention

The present invention relates to a solid polymer fuel cell and particularly, to a solid polymer fuel cell including an electrolyte membrane having a polymer ion-exchange component, and an air electrode and a fuel electrode between which the electrolyte membrane is sandwiched.

2. Description of the Related Art

There are conventionally known air and fuel electrodes, each of which is formed of a polymer ion-exchange component adapted to provide a proton conductivity to the air and fuel electrodes and functioning as a binder, catalyst particles comprising a catalyst metal carried on surfaces of carbon black particles, and polytetrafluoroethylene (PTFE) particles. The PTFE particles have a water-repellent property and function to adjust the water retention of each of the air electrodes and the fuel electrodes.

However, the use of the PTFE particles as a component for forming each of the air electrode and the fuel electrode is an obstacle for satisfying a requirement that the thickness of each of the air electrode and the fuel electrode is reduced to enhance the proton conductivity and to suppress the resistance over-voltage to a low level in order to provide a further enhancement in power-generating performance.

Such type of fuel cell employs a means of supplying air and hydrogen to the air electrode and the fuel electrode respectively after a moistening treatment in order to maintain the electrolyte membrane in a wet state and to ensure the proton conductivity of the electrolyte membrane. For this reason, the mounting of a moistener to an air supply line and a hydrogen supply line, an air-tight and water-tight sealing operation in the mounting of the moistener and the like are required. If a portion or all of the above-described means could be omitted, it would be effective for reducing the equipment cost and simplifying the structure.

SUMMARY OF THE INVENTION

Accordingly, it is an object of the present invention to provide a solid polymer fuel cell of the above-described type, wherein the thickness of each of the air electrode and the fuel electrode can be reduced to provide a further enhancement n power-generating performance.

To achieve the above object, according to the present invention, there is provided a solid polymer fuel cell including an electrolyte membrane having a polymer ion-exchange component, and an air electrode and a fuel electrode between which the electrolyte membrane is sandwiched, each of the air electrode and the fuel electrode being formed of a plurality of catalyst particles including a catalyst metal carried on surfaces of carbon black particles, and a polymer ion-exchange component. The fuel cell can be moistened from both of the side of the air electrode and the side of the fuel electrode, and the carbon black particles can have a water-repellent property such that an amount A of water adsorbed under a saturated steam pressure at 60° C. is equal to or smaller than 80 cc/g, and if a weight of polymer ion-exchange component incorporated is represented by Wp, and a weight of carbon black particles incorporated is represented by Wc, a ratio Wp/Wc of the weight Wp of polymer ion-exchange component incorporated to the weight Wc of carbon black particles incorporated is in a range of $0.4 \leq Wp/Wc \leq 1.25$.

With such an arrangement, it is possible to provide the water-repellent carbon black particles with a function of adjusting the water retention of each of the air electrode and the fuel electrode, thereby avoiding the need for polytetrafluoroethylene (PTFE) particles. This is effective for reducing the thickness of each of the air electrode and the fuel electrode.

In addition, if the carbon black particles have the water-repellent property as described above, the flowing of moistening water into the electrolyte membrane and an excessive amount of water flowing out of each of the air electrode and the fuel electrode are conducted smoothly in the air electrode and the fuel electrode. Such an effect is not obtained when the amount A of water adsorbed is larger than 80 cc/g. This is because the water-repellent property of the carbon black particles is decreased.

Further, if the ratio Wp/Wc of the weights incorporated is set in the above-described range, the reduction in thickness of each of the air electrode and the fuel electrode due to the absence of PTFE particles can be promoted to enhance the proton conductivity, and the increase in resistance over-voltage can be inhibited to enhance the power-generating performance. However, if the ratio Wp/Wc is smaller than 0.4, the thickness of each of the air electrode and the fuel electrode is further reduced, but the rate of coating of the catalyst particles is degraded, resulting in a deteriorated power-generating performance. On the other hand, if Wp/Wc>1.25, the degree D of dispersion of the polymer ion-exchange component is degraded, and the thickness of each of the air electrode and the fuel electrode is increased.

It is another object of the present invention to provide a solid polymer fuel cell of the above-described type, in which the thickness of each of the air electrode and the fuel electrode can be reduced to provide a further enhancement in power-generating performance, and which can be operated with the moistening conducted from only the side of the air electrode by providing the particular air and fuel electrodes.

To achieve the above object, according to the present invention, there is provided a solid polymer fuel cell comprising an electrolyte membrane having a polymer ion-exchange component, and an air electrode and a fuel electrode between which the electrode being formed of a plurality of catalyst particles including a catalyst metal carried on surfaces of carbon black particles, and a polymer ion-exchange component, the fuel cell being moistened from only the side of the air electrode wherein the carbon black particles in the air electrode have a water-repellent property such that an amount A of water adsorbed under a saturated steam pressure at 60° C. is equal to or smaller than 80 cc/g, and if a weight of polymer ion-exchange component incorporated in the air electrode is represented by Wp, and a weight of carbon black particles incorporated in the air electrode is represented by Wc, a ratio Wp/Wc of the weights Wp and Wc is in a range of $0.2 \leq Wp/Wc \leq 0.8$ and wherein the carbon black particles in the fuel electrode have a hydrophilic property such that an amount A of water adsorbed under a saturated steam pressure at 60° C. is equal to or larger than 150 cc/g, and if a weight of polymer ion-exchange component incorporated in the fuel electrode is represented by Wp, and a weight of carbon black particles incorporated in the fuel electrode is represented by Wc, a ratio Wp/Wc of the weights Wp and Wc is in a range of $0.6 \leq Wp/Wc \leq 1.25$.

With the above arrangement, it is possible for each of the water-repellent carbon black particles and the hydrophilic carbon black particles to have a function of adjusting the water retention of each of the air electrode and the fuel electrode, thereby avoiding the need for PTFE particles. This is effective for reducing the thickness of each of the air electrode and the fuel electrode.

In addition, if the ratio Wp/Wc of the weights Wp and Wc incorporated in each of the air electrode and the fuel electrode is set in the above-described range, the reduction in thickness of each of the air electrode and the fuel electrode due to the lack of PTFE particles being contained therein can be promoted to enhance the proton conductivity, and an increase in resistance over-voltage can be inhibited to enhance the power-generating performance.

However, if the ratio Wp/Wc in the air electrode is smaller than 0.2, the thickness of the air electrode is further reduced, but the rate of coating of the catalyst particles is degraded, resulting in a deteriorated power-generating performance. On the other hand, if Wp/Wc>0.8, the thickness of the air electrode is increased, and the flowing of moistening water is degraded. If the ratio Wp/Wc in the fuel electrode is smaller than 0.6, the water retention is degraded. On the other hand, if Wp/Wc>1.25 in the fuel electrode, the degree of dispersion of the polymer ion-exchange component is degraded, resulting in an increased thickness of the fuel electrode.

Further, since a moistener is disposed only on the side of an air supply line, it is possible to reduce the equipment cost and to simplify the structure.

In this case, when the moistening is carried out from the side of the air electrode, the moistening water flows smoothly into the electrolyte membrane, because the carbon black particles in the air electrode are water-repellent. In addition, the diffusion of a portion of water produced in the air electrode back to the electrolyte membrane also occurs and hence, the electrolyte membrane is brought into a wet state. On the other hand, a portion of water in the electrolyte membrane flows into the fuel electrode, and is retained in the fuel electrode, because the carbon black particles in the fuel electrode are hydrophilic. The electrolyte membrane is maintained in the wet state by the retaining of the water in the fuel electrode and by the moistening of the air electrode. An excessive amount of water in each of the air electrode and the fuel electrode is discharged to the outside.

However, if the amount A of water adsorbed in the carbon black particles in the air electrode is larger than 80 cc/g, the water-repellent property of the carbon black particles is reduced, resulting in a deterioration in the flow of the moistening water. On the other hand, if the amount A of water adsorbed in the carbon black particles in the fuel electrode is smaller than 150 cc/g, the hydrophilic property of the carbon black particles is reduced, resulting in an insufficient retention of water.

It is a further object of the present invention to provide a solid polymer fuel cell of the above-described type, in which the thickness of each of the air electrode and the fuel electrode can be reduced to provide a further enhancement in power-generating performance, and which can be operated with the moistening conducted from only the side of the fuel electrode by providing the particular air and fuel electrode.

To achieve the above object, according to the present invention, there is provided a solid polymer fuel cell comprising an electrolyte membrane having a polymer ion-exchange component, and an air electrode and a fuel electrode between which the electrolyte membrane is sandwiched, each of the air electrode and the fuel electrode being formed of a plurality of catalyst particles including a catalyst metal carried on surfaces of carbon black particles, and a polymer ion-exchange component, the fuel cell being moistened from only the side of the fuel electrode, wherein the carbon black particles in the fuel electrode have a water-repellent property such that an amount A of water adsorbed under a saturated steam pressure at 60° C. is equal to or smaller than 80 cc/g, and if a weight of polymer ion-exchange component incorporated in the fuel electrode is represented by Wp, and a weight of carbon black particles incorporated in the fuel electrode is represented by Wc, a ratio Wp/Wc of the weights Wp and Wc is in a range of $0.2 \leq Wp/Wc \leq 0.8$, and wherein the carbon black particles in the air electrode have a hydrophilic property such that an amount A of water adsorbed under a saturated steam pressure at 60° C. is equal to or larger than 150 cc/g, and if a weight of polymer ion-exchange component incorporated in the air electrode is represented by Wp, and a weight of carbon black particles incorporated in the air electrode is represented by Wc, a ratio Wp/Wc of the weights Wp and Wc is in a range of $0.6 \leq Wp/Wc \leq 1.25$.

With the above arrangement, it is possible for each of the water-repellent carbon black particles and the hydrophilic carbon black particles to have a function of adjusting the water retention of each of the air electrode and the fuel electrode, without the inclusion of PTFE particles. This is effective for reducing the thickness of each of the air electrode and the fuel electrode.

In addition, if the ratio Wp/Wc of the weights Wp and Wc incorporated in each of the air electrode and the fuel electrode is set in the above-described range, the reduction in thickness of each of the air electrode and the fuel electrode due to PTFE particles not being contained can be promoted to enhance the proton conductivity, and an increase in resistance over-voltage can be inhibited to enhance the power-generating performance.

However, if the ratio Wp/Wc in the fuel electrode is smaller than 0.2, the thickness of the fuel electrode is further reduced, but the rate of coating of the catalyst particles is degraded, resulting in a deteriorated power-generating performance. On the other hand, if Wp/Wc>0.8, the thickness of the fuel electrode is increased, and the flow of moistening water is degraded. If the ratio Wp/Wc in the air electrode is smaller than 0.6, the water retention is degraded. On the other hand, if Wp/Wc>1.25 in the air electrode, the degree of dispersion of the polymer ion-exchange component is degraded, resulting in an increased thickness of the air electrode.

Further, it is possible to reduce the equipment cost and to simplify the structure by disposing a moistener only on the side of a hydrogen supply line.

In this case, when the moistening is carried out from the side of the fuel electrode, the moistening water flows smoothly into the electrolyte membrane, because the carbon black particles in the fuel electrode are water-repellent. In addition, the diffusion of a portion of water produced in the air electrode back to the electrolyte membrane also occurs and hence, the electrolyte membrane is brought into a wet state. On the other hand, a portion of the water produced and the water flowing from the electrolyte membrane into the fuel electrode are retained in the air electrode, because the carbon black particles in the air electrode are hydrophilic. The electrolyte membrane is maintained in a wet state by the retaining of the water in the air electrode and by the moistening of the fuel electrode. An excessive amount of water in each of the air electrode and the fuel electrode is discharged to the outside.

However, if the amount A of water adsorbed in the carbon black particles in the fuel electrode is larger than 80 cc/g, the water-repellent property of the carbon black particles is reduced, resulting in a deterioration in the flow of the moistening water. On the other hand, if the amount A of water adsorbed in the carbon black particles in the air electrode is smaller than 150 cc/g, the hydrophilic property of the carbon black particles is reduced, resulting in an insufficient retention of water.

It is a yet further object of the present invention to provide a solid polymer fuel cell of the above-described type, which can be operated in a non-moistened state by providing particular air and fuel electrodes.

To achieve the above object, according to embodiments of the present invention, there is provided a solid polymer fuel cell comprising an electrolyte membrane having a polymer ion-exchange component, and an air electrode and a fuel electrode between which the electrolyte membrane is sandwiched, each of the air electrode and the fuel electrode being formed of a plurality of catalyst particles including a catalyst metal carried on surfaces of carbon black particles, and a polymer ion-exchange component, the fuel cell being operable in a non-moistened state (without a moistener), wherein the carbon black particles preferably have a hydrophilic property such that an amount A of water adsorbed under a saturated steam pressure at 60° C. can be equal to or larger than 150 cc/g, and if a weight of polymer ion-exchange component incorporated is represented by Wp, and a weight of carbon black particles incorporated is represented by Wc, a ratio Wp/Wc of the weights Wp and Wc is preferably in a range of $0.4 \leq Wp/Wc \leq 1.25$.

If the carbon black particles have a hydrophilic property as described above, the production and retaining of water in the air electrode and the diffusion of the produced water back to the electrolyte membrane occur. The diffused-back water is used as water entrained with the migration if protons within the electrolyte membrane and in addition, flows into and is retained in the fuel electrode. In this way, both of the electrodes always retain water and hence, the wet state of the electrolyte membrane is ensured, and the diffusion-back of the produced water and the entraining of protons are repeatedly conducted within the membrane. Therefore, the conduction of the protons is ensured in the non-moistened state. An excessive amount of water in each of the air electrode and the fuel electrode is discharged to the outside. However, if the amount A of water adsorbed in the carbon black particles is smaller than 150 cc/g, it is difficult to generate the diffusion-back.

If the ratio Wp/Wc of the weights Wp and Wc is set in the above-described range, the thickness of each of the air electrode and the fuel electrode can be reduced to enhance the proton conductivity, and the increase in resistance overvoltage can be inhibited to enhance power-generating performance. In addition, it is not required that PTFE particles are contained in each of the electrodes. This also provides a reduction in thickness of each of the electrodes. However, if the ratio Wp/Wc is smaller than 0.4, the thickness of the electrode is reduced, but the rate of coating of the catalyst particles is degraded, resulting in a deterioration in power-generating performance. On the other hand, if Wp/Wc is greater than 1.25, the degree of dispersion of the polymer ion-exchange component is degraded and hence, the thickness of the electrode is increased.

Further, a moistener is not required and hence, it is possible to provide a solid polymer fuel cell which is inexpensive and is of a simple structure.

BRIEF DESCRIPTION OF THE DRAWINGS

The above and other objects, features and advantages of the invention will become apparent from the following description of preferred embodiments taken in conjunction with the accompanying drawings, in which.

DESCRIPTION OF THE PREFERRED EMBODIMENTS

Figure 1:
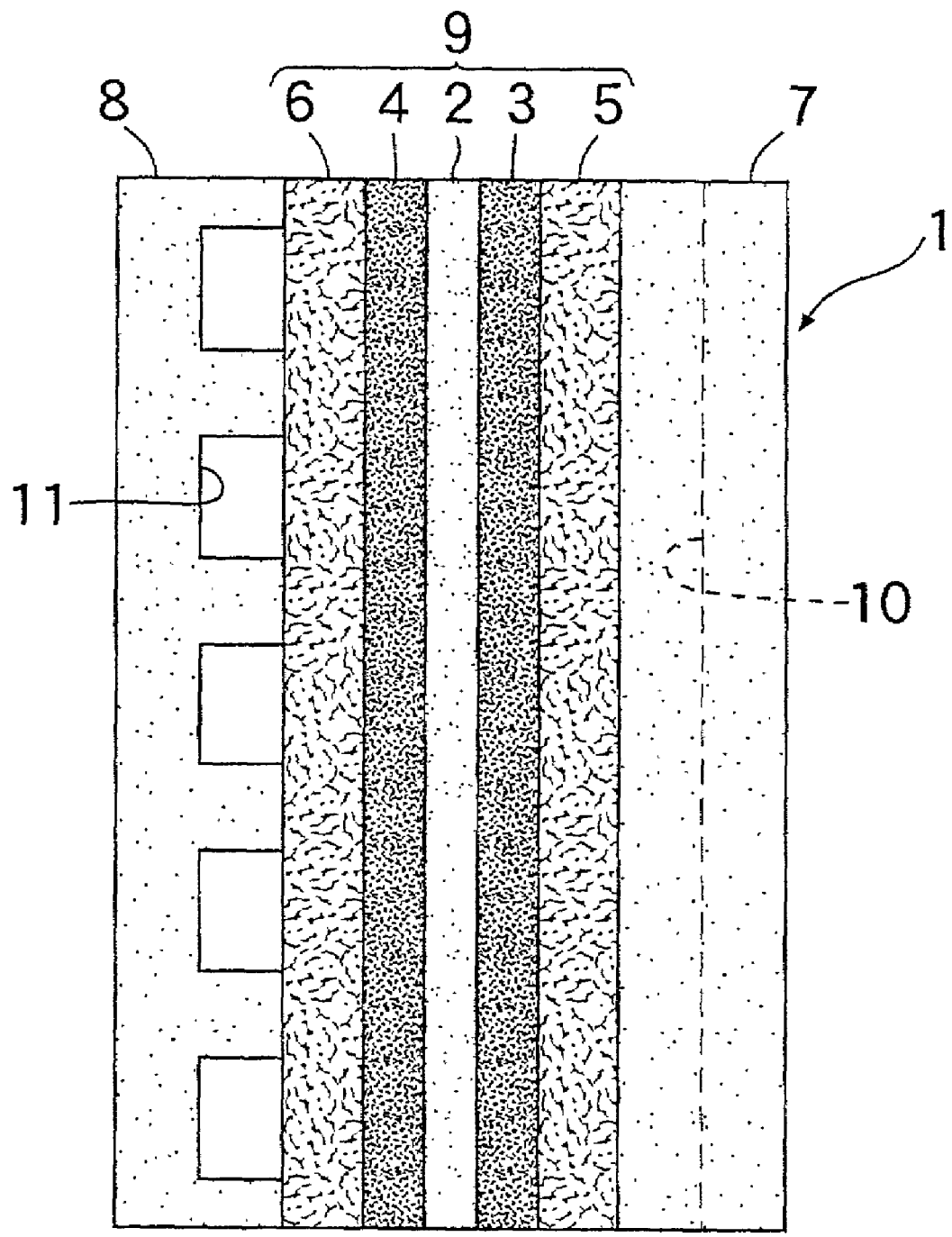
FIG. 1 is a schematic side view of a solid polymer fuel cell in accordance with embodiments of this invention.

Referring to FIG. 1, a solid polymer fuel cell 1 that can be used in embodiments of this invention, includes an electrolyte membrane 2, a pair of electrodes disposed in close contact with opposite sides of the electrolyte membrane interposed therebetween, namely, an air electrode 3 and a fuel electrode 4, a pair of diffusion layers 5 and 6 disposed in close contact with the electrodes 3 and 4, respectively, and a pair of separators 7 and 8 disposed in close contact with the diffusion layers 5 and 6. In this case, a moistening can be carried out from both of the sides of the electrodes 3 and 4. The electrolyte membrane 2, the air electrode 2, the fuel electrode 4 and the diffusion layers 5 and 6 are included in a membrane electrode assembly 9.

The electrolyte membrane 2 can be formed of a polymer ion-exchange component having a proton conductivity, e.g., an aromatic hydrocarbon polymer ion-exchange component in some embodiments of this invention. Each of the air electrode 3 and the fuel electrode 4 can be formed of a plurality of catalyst particles including Pt particles as catalyst metal particles carried on surfaces of carbon black particles, and a polymer ion-exchange component which has a proton conductivity and a function as a binder, which is the same as or different from the above-described polymer ion-exchange component, e.g., an aromatic hydrocarbon polymer ion-exchange component in embodiments, and which does not contain PTFE particles as a third component.

Each of the diffusion layers 5 and 6 can be formed of a porous carbon paper, a carbon plate or the like, and the separators 7 and 8 can be formed of graphitized carbon to have the same shape. Air can be supplied to a plurality of grooves 10 provided in the separator 7 located adjacent the air electrode 3, and hydrogen can be supplied to a plurality of grooves 11 provided in the separator 8 adjacent the fuel electrode 4 in a intersecting relation to the grooves 10.

The aromatic hydrocarbon polymer ion-exchange component can have such a nature that it is free of fluorine and is soluble in a solvent. Examples of such polymer ion-exchange components which may be used are various sulfonated aromatic hydrocarbon polymers shown in Table 1.

TABLE 1

| Polymer ion-exchange component | Base material | Substituent for H-atom in benzene ring of base material |
|---|---|---|
| Example 1 | Polyether-ether ketone (PEEK) | Sulfonic group |
| Example 2 | Polyether sulfone (PES) | |
| Example 3 | Polysulfone (PSF) | |
| Example 4 | Polyetherimide (PEI) | |
| Example 5 | Polyphenylene sulfide (PPS) | |
| Example 6 | Polyphenylene oxide (PPO) | |

Examples of a solvent which may be used are various polar solvents shown in Table 2.

TABLE 2

| Polar solvent | Boiling point |
|---|---|
| Dimethylacetoamide (DMAc) | 165.5° C. |
| Dimethylformamide (DMF) | 153° C. |
| Dimethylsulfoxide (DMSO) | 189° C. |
| Triethylphosphate (TEP) | 115° C. |
| N-methylpyrrolidone (NMP) | 202° C. |

Carbon black particles used in each of the air electrode 3 and the fuel electrode 4 are those having such a water-repellent property that an amount A of water adsorbed under a saturated steam pressure at 60° C. was equal to or lower than 80 cc/g.

If the carbon black particles are provided with a water-repellent property, as described above, the flowing of moistening water into the electrolyte membrane and the flowing of an excessive amount of water out of both the electrode 3 and 4 are conducted smoothly.

If the weight of polymer ion-exchange component incorporated in each of the air electrode 3 and the fuel electrode 4 is represented by Wp, and the weight of carbon black particles incorporated in each of the air electrode 3 and the fuel electrode 4 is represented by Wc, the ratio Wp/Wc between the weights Wp and Wc is set in a range of $0.4 \leq Wp/Wc \leq 1.25$.

If the ratio Wp/Wc between the weights Wp and Wc is set in such range, the reduction in thickness of each of the air electrode 3 and the fuel electrode 4 can be promoted to enhance the proton conductivity, and the increase in resistance over-voltage can be inhibited to enhance the power-generating performance.

Particular examples will be described below.

I. Production of Electrode

Platinum (Pt) particles were carried on carbon black particles (under a trade name of Vulcan XC-72) having such a water-repellent property that an amount A of water adsorbed under a saturated steam pressure at 60° C. was equal to 72 cc/g, thereby preparing catalyst particles. The content of the Pt particles in the catalyst particles was 50% by weight.

EXAMPLE I

The sulfonated PEEK shown as Example 1 in Table 1 was prepared as the aromatic hydrocarbon polymer ion-exchange component and dissolved in NMP shown in Table 2 under reflux. The content of the sulfonated PEEK in the solution was 6% by weight. The catalyst particles were mixed into the sulfonated PEEK-containing solution, so that the ratio Wp/Wc of the weight Wp of sulfonated PEEK incorporated to the weight Wc of carbon black particles incorporated was equal to 0.2. Then, the catalyst particles were dispersed in the sulfonated PEEK-containing solution using a ball mill to prepare a slurry for an electrode. The slurry was applied onto one surface of each of a plurality of porous carbon papers, so that the content of Pt was 0.5 mg/cm$^2$. The slurry on each of the papers was then dried to provide an electrode having a diffusion layer. These electrodes are referred to as example (1).

EXAMPLE II

A process similar to that in EXAMPLE I was carried out except that the ratio Wp/Wc of weight Wp of sulfonated PEEK incorporated to the weight Wc of carbon black particles incorporated was set at 0.4, thereby producing a plurality of electrodes each having a diffusion layer. These electrodes are referred to as example (2).

EXAMPLE III

A process similar to that in EXAMPLE I was carried out except that the ratio Wp/Wc of weight Wp of sulfonated PEEK incorporated to the weight Wc of carbon black particles incorporated was set at 0.6, thereby producing a plurality of electrodes each having a diffusion layer. These electrodes are referred to as example (3).

EXAMPLE IV

A process similar to that in EXAMPLE I was carried out except that the ratio Wp/Wc of weight Wp of sulfonated PEEK incorporated to the weight Wc of carbon black particles incorporated was set at 0.8, thereby producing a plurality of electrodes each having a diffusion layer. These electrodes are referred to as example (4).

EXAMPLE V

A process similar to that in EXAMPLE I was carried out except that the ratio Wp/Wc of weight Wp of sulfonated PEEK incorporated to the weight Wc of carbon black particles incorporated was set at 1.25, thereby producing a plurality of electrodes each having a diffusion layer. These electrodes are referred to as example (5).

EXAMPLE VI

A process similar to that in EXAMPLE I was carried out except that the ratio Wp/Wc of weight Wp of sulfonated PEEK incorporated to the weight Wc of carbon black particles incorporated was set at 1.75, thereby producing a plurality of electrodes each having a diffusion layer. These electrodes are referred to as example (6).

II. Considerations Pertaining to Electrodes

Table 3 shows the relationship between the ratio Wp/Wc of weight Wp of sulfonated PEEK incorporated to the weight Wc of carbon black particles incorporated and the water-retention of the electrode for electrode examples (1) to (6). The water retention was calculated from the amount of water adsorbed under the saturated steam pressure at 60° C. by a gas adsorption device.

TABLE 3

| Electrode | Ratio Wp/Wc of weights | Water retention (%) of electrode |
|---|---|---|
| Example (1) | 0.2 | 48 |
| Example (2) | 0.4 | 51 |
| Example (3) | 0.6 | 52 |
| Example (4) | 0.8 | 54 |
| Example (5) | 1.25 | 57 |
| Example (6) | 1.75 | 61 |

Figure 2:
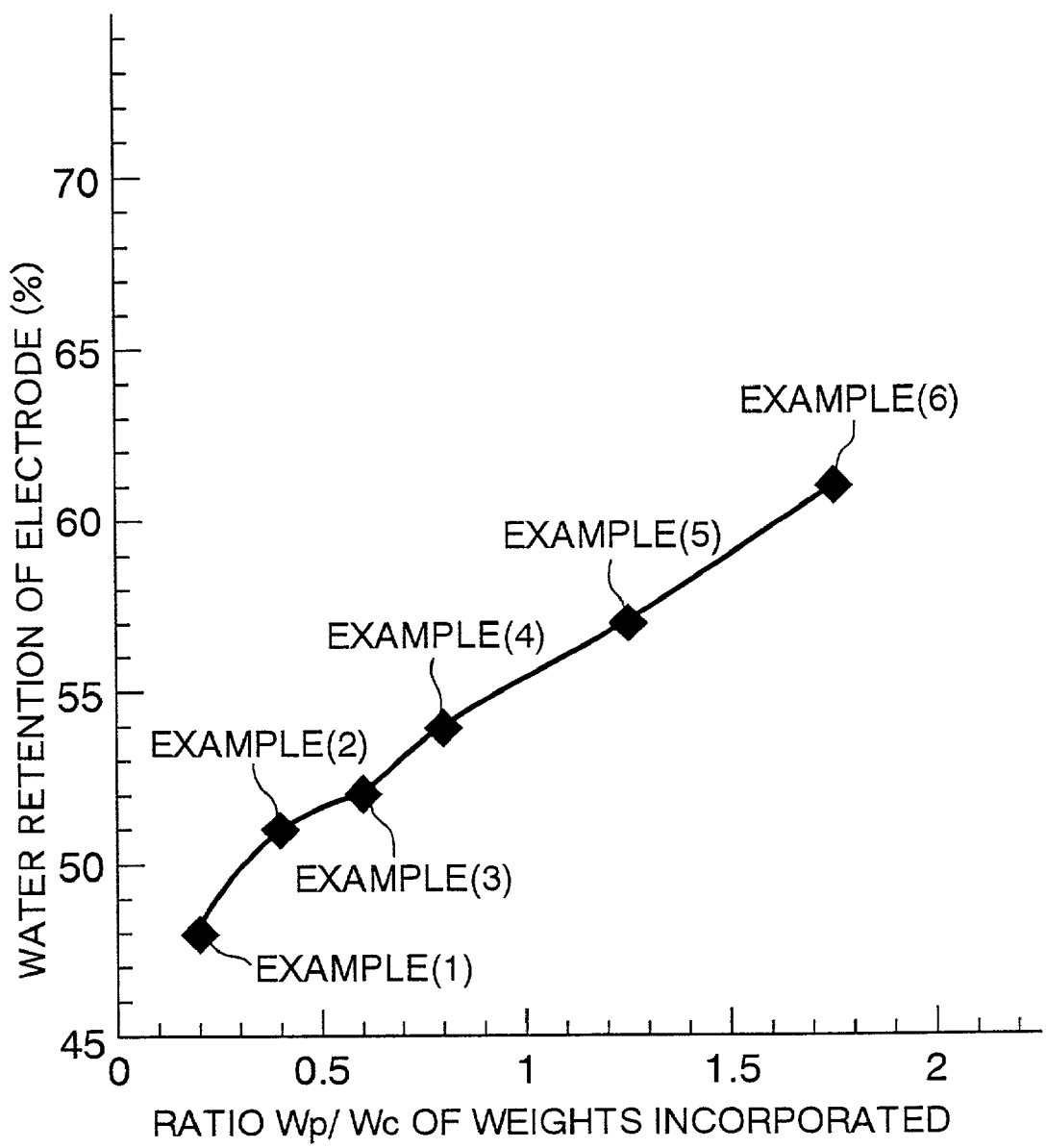
FIG. 2 is a graph showing a first example of the relationship between the ratio Wp/Wc of weights incorporated and the water retention of each of electrodes.

FIG. 2 is a graph made based on Table 3 and showing the relationship between the ratio Wp/Wc of the weights and the water retention of the electrode. It can be seen from FIG. 2 that the water retention of the electrode is increased with an increase in ratio Wp/Wc.

Table 4 shows the relationship between the ratio Wp/Wc of the weights and the thickness of the electrode for the electrode examples (1) to (6).

TABLE 4

| Electrode | Ratio Wp/Wc of weights | Thickness (μm) of electrode |
|---|---|---|
| Example (1) | 0.2 | 3 |
| Example (2) | 0.4 | 5 |
| Example (3) | 0.6 | 6 |
| Example (4) | 0.8 | 7 |
| Example (5) | 1.25 | 8 |
| Example (6) | 1.75 | 9 |

Figure 3:
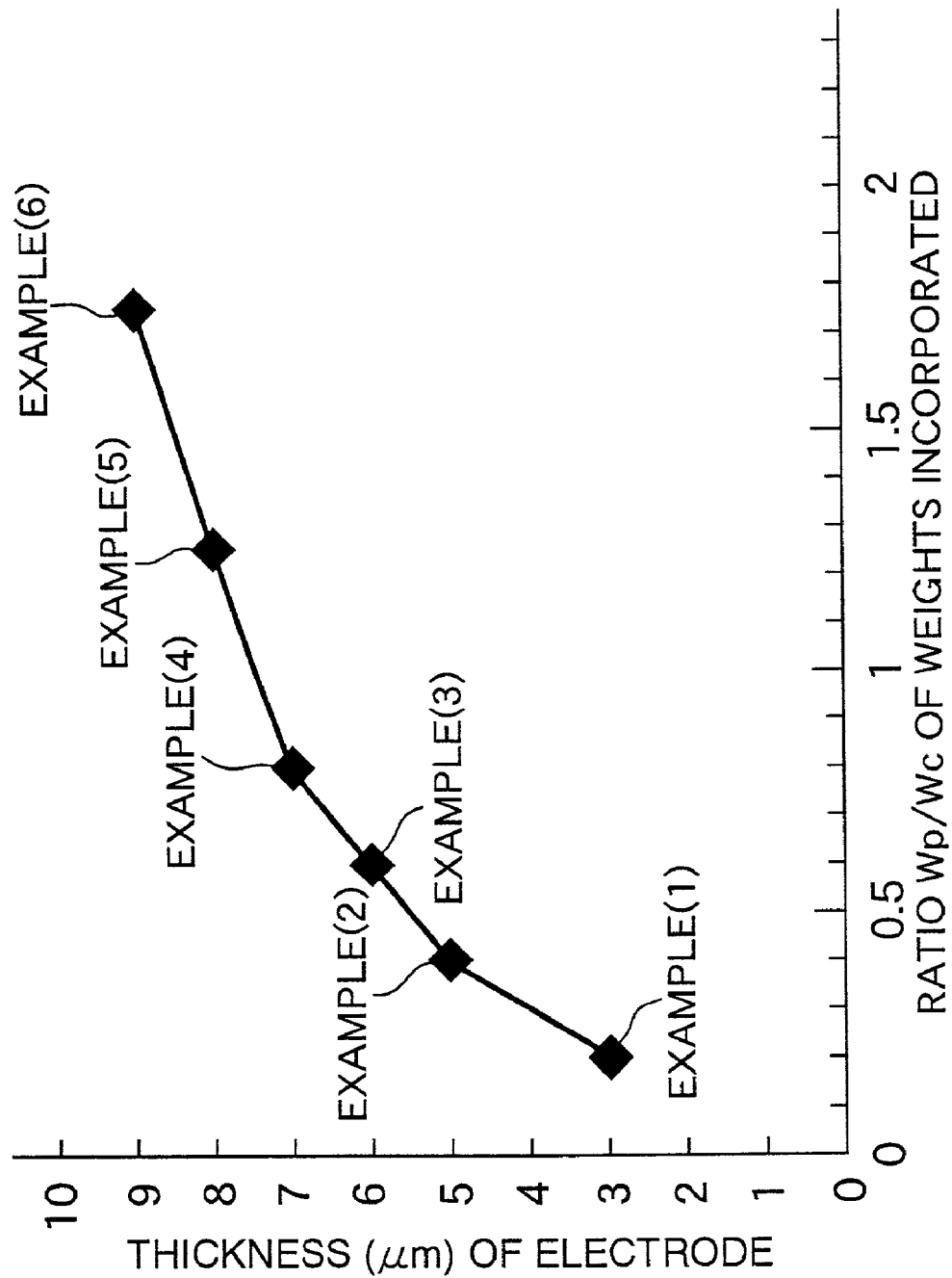
FIG. 3 is a graph showing a first example of the relationship between the ratio Wp/Wc of weights incorporated and the thickness of each of the electrodes.

FIG. 3 is a graph made based on Table 4 and showing the relationship between the ratio Wp/Wc of the weights and the thickness of the electrode. It can be seen from FIG. 3 that the thickness of the electrode is increased with an increase in the ratio Wp/Wc.

Table 5 shows the relationship between the ratio Wp/Wc of the weights and the rate Cc of coating of the catalyst particles for the electrode examples (1) to (6).

TABLE 5

| Electrode | Ratio Wp/Wc of weights | Rate Cc (%) of coating of catalyst particles |
|---|---|---|
| Example (1) | 0.2 | 72 |
| Example (2) | 0.4 | 91 |
| Example (3) | 0.6 | 95 |
| Example (4) | 0.8 | 97 |
| Example (5) | 1.25 | 98 |
| Example (6) | 1.75 | 98 |

The ratio Cc of coating of the catalyst particles was determined according to Cc={(Ae−Ac)/Ae}×100 (%), wherein Ae represents an area of a plane of the electrode, and Ac represents a sum of areas of the catalyst particles exposed on the plane of the electrode.

Figure 4:
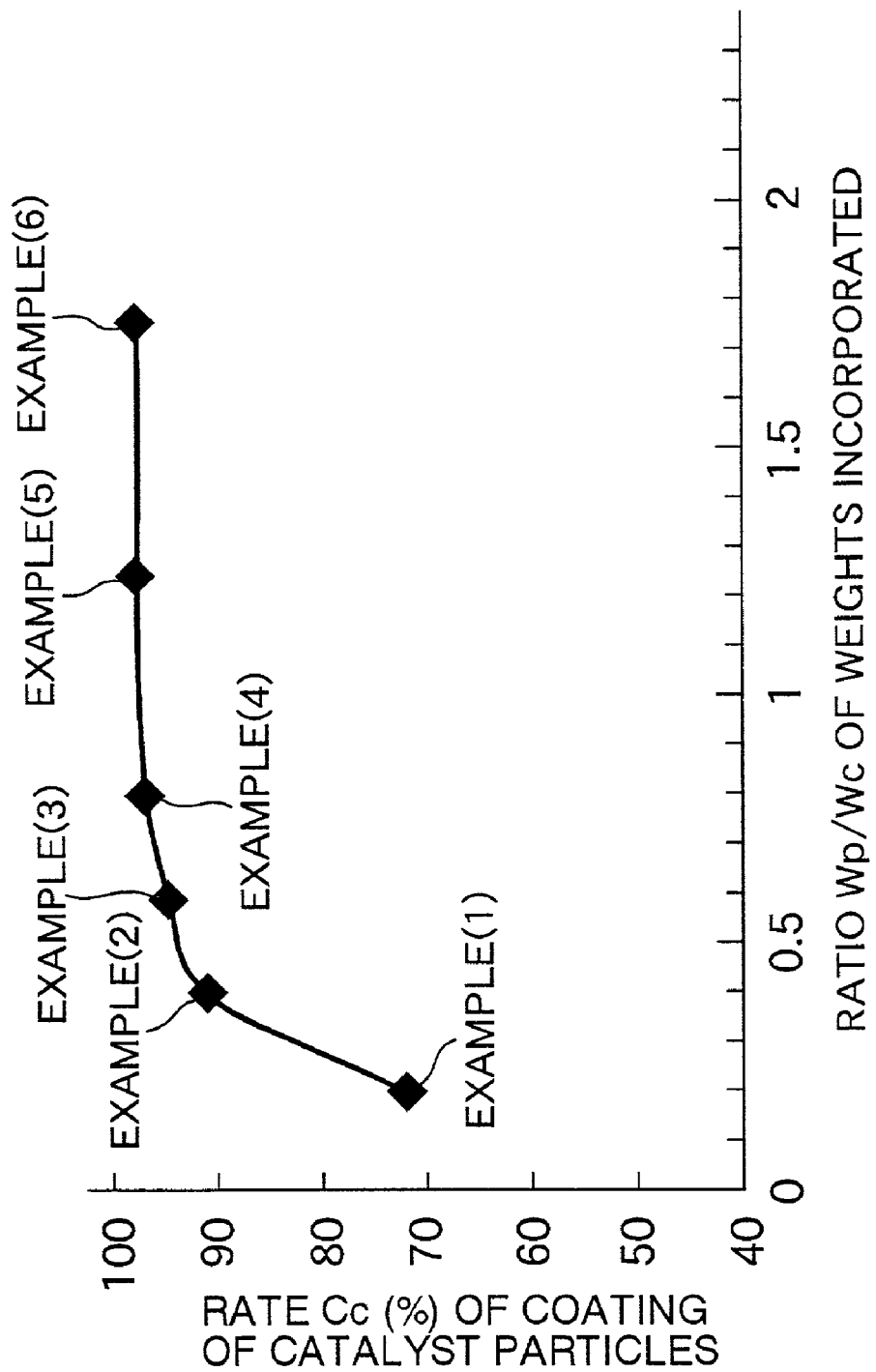
FIG. 4 is a graph showing a first example of the relationship between the ratio Wp/Wc of weights incorporated and the rate Cc of coating of catalyst particles.

FIG. 4 is a graph made based on Table 5 and showing the relationship between the ratio Wp/Wc of the weights and the rate Cc of coating of the catalyst particles. It can be seen from FIG. 4 that the rate Cc of coating of the catalyst particles is increased with an increase in ratio Wp/Wc.

Table 6 shows the relationship between the ratio Wp/Wc of the weights and the degree D of dispersion of catalyst particles for the electrode examples (1) to (6).

TABLE 6

| Electrode | Ratio Wp/Wc of weights | Degree D (%) of dispersion of catalyst particles |
| --- | --- | --- |
| Example (1) | 0.2 | 2 |
| Example (2) | 0.4 | 3 |
| Example (3) | 0.6 | 5 |
| Example (4) | 0.8 | 7 |
| Example (5) | 1.25 | 8 |
| Example (6) | 1.75 | 9 |

The degree D of dispersion of the catalyst particles was determined in the following manner: First, a theoretical concentration Tp of platinum (Pt) as a theoretical concentration of catalyst metal in the catalyst particles and a theoretical concentration Ts of sulfur (S) in the sulfonated PEEK were calculated from the amounts of sulfonated PEEK and catalyst particles incorporated at the time of the manufacture of the electrode, and a theoretical ratio Ts/Tp was then determined from such theoretical values Tp and Ts. The surface of the electrode was observed by EPMA, and an actual concentration Ap of Pt as an actual concentration of catalyst metal in the catalyst particles and an actual concentration of S in the sulfonated PEEK were determined by a surface analysis, and an actual ratio As/Ap was determined from such actual values As and Ap. Thereafter, a degree D of dispersion of the catalyst particles was determined according to the following equation:

$$D = (\{(Ts/Tp) - (As/Ap)\}/(Ts/Tp)) \times 100 \ (\%)$$

Figure 5:
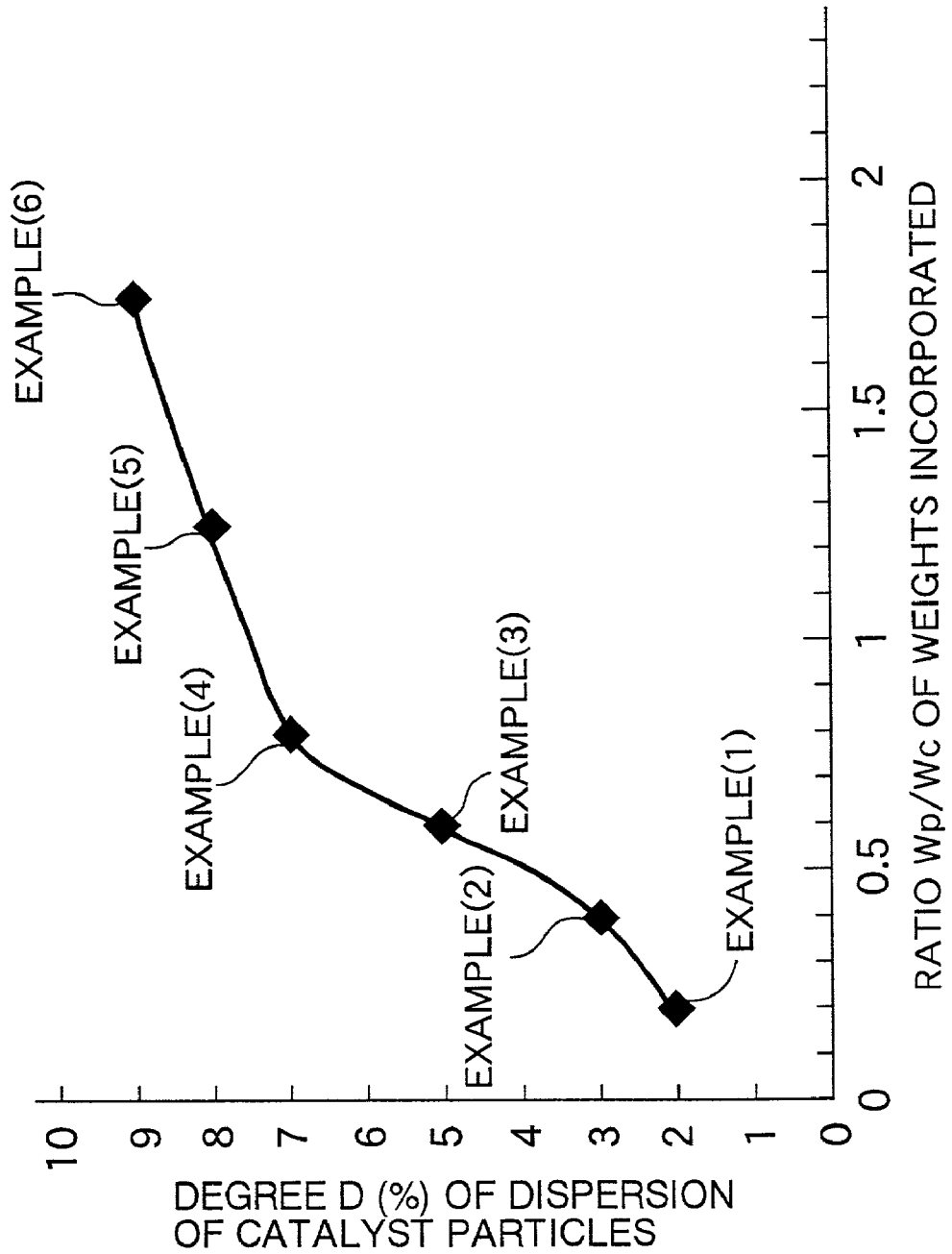
FIG. 5 is a graph showing a first example of the relationship between the ratio Wp/Wc of weights incorporated and the degree D of dispersion of the catalyst particles.

FIG. 5 is a graph made based on Table 6 and showing the relationship between the ratio Wp/Wc of the incorporated weights and the degree D of dispersion of the catalyst particles. It can be seen from FIG. 5 that the degree D of dispersion of the catalyst particles is increased with an increase in ratio Wp/Wc.

Table 7 shows the relationship between the degree D of dispersion of the catalyst particles and the rate Cc of coating of the catalyst particles for the electrode examples (1) to (6).

TABLE 7

| Electrode | Degree D (%) of dispersion of catalyst particles | Rate Cc (%) of coating of catalyst particles |
| --- | --- | --- |
| Example (1) | 2 | 72 |
| Example (2) | 3 | 91 |
| Example (3) | 5 | 95 |
| Example (4) | 7 | 97 |
| Example (5) | 8 | 98 |
| Example (6) | 9 | 98 |

Figure 6:
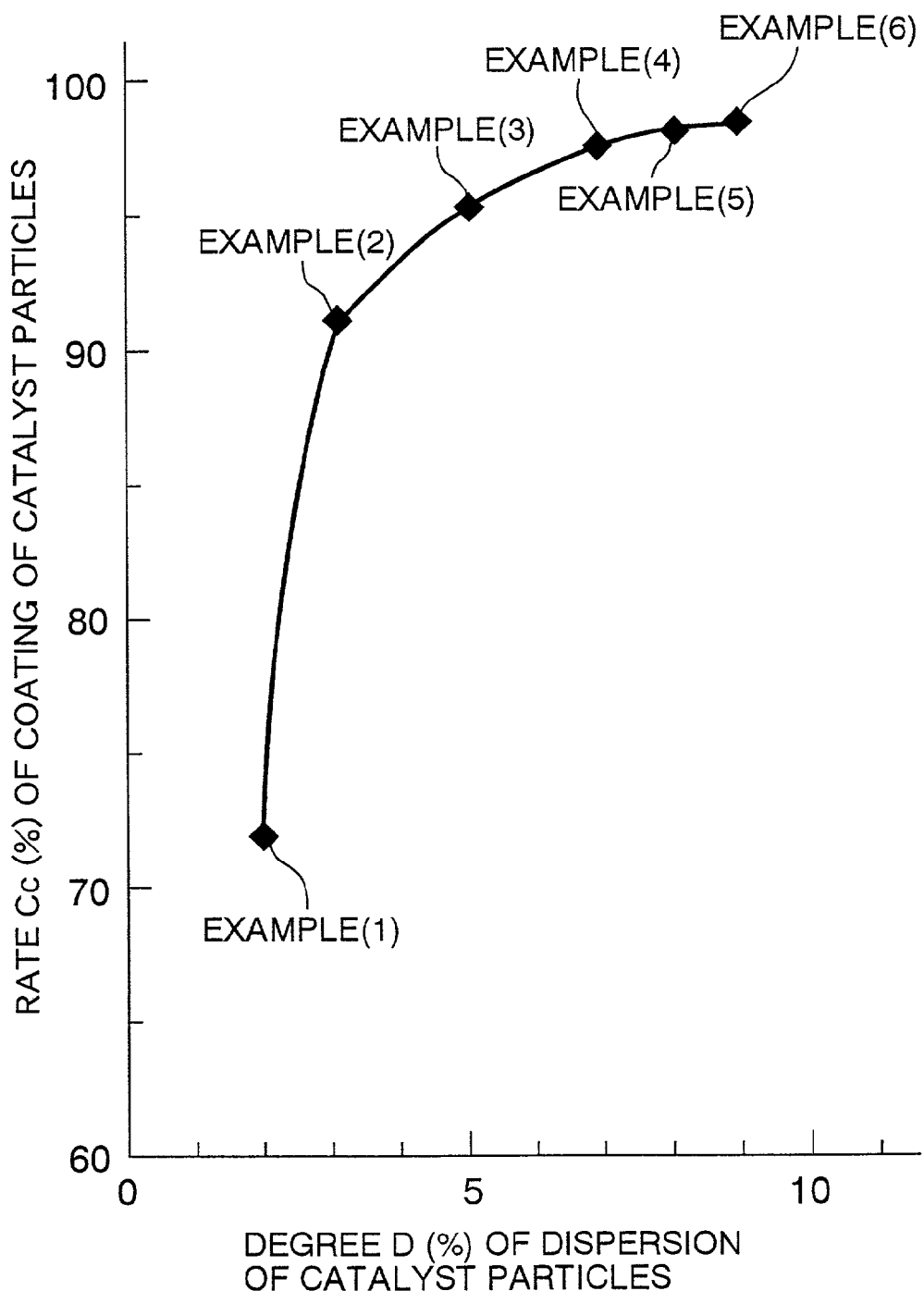
FIG. 6 is a graph showing the relationship between the degree D of dispersion of the catalyst particles and the rate Cc of coating of catalyst particles.

FIG. 6 is a graph made based on Table 7 and showing the relationship between the degree D of dispersion of the catalyst particles and the rate Cc of coating of the catalyst particles. It can be seen from FIG. 6 that the rate Cc of coating of the catalyst particles is increased with an increase in the degree D of dispersion of the catalyst particles.

Table 8 shows the relationship between the degree D of dispersion of the catalyst particles and the thickness of the electrode for the electrode examples (1) to (6).

TABLE 8

| Electrode | Degree D (%) of dispersion of catalyst particles | Thickness (μm) of the electrode |
| --- | --- | --- |
| Example (1) | 2 | 3 |
| Example (2) | 3 | 5 |
| Example (3) | 5 | 6 |

TABLE 8-continued

| Electrode | Degree D (%) of dispersion of catalyst particles | Thickness (μm) of the electrode |
| --- | --- | --- |
| Example (4) | 7 | 7 |
| Example (5) | 8 | 8 |
| Example (6) | 9 | 9 |

Figure 7:
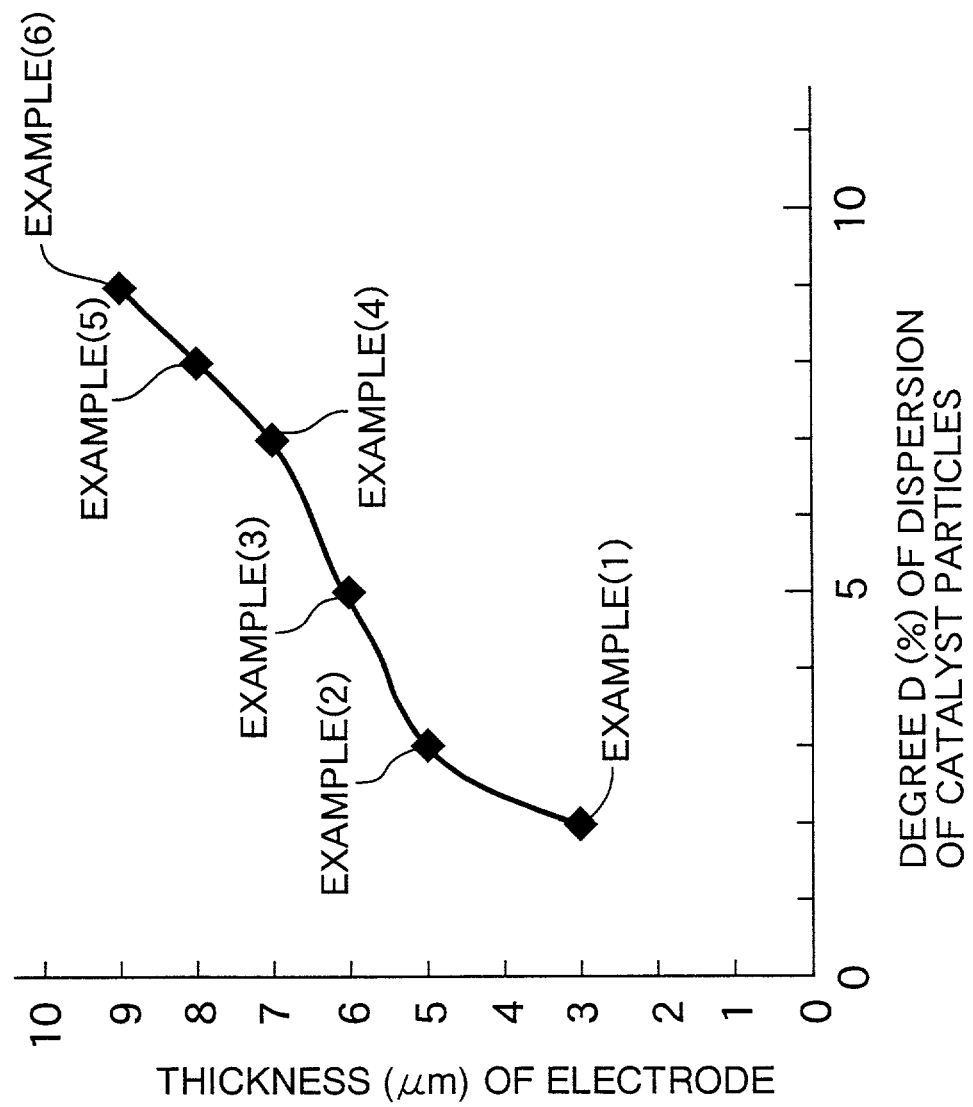
FIG. 7 is a graph showing a first example of the relationship between the degree D of dispersion of the catalyst particles and the thickness of each of the electrodes.

FIG. 7 is a graph made based on Table 8 and showing the relationship between the degree D of dispersion of the catalyst particles and the thickness of the electrode. It can be seen from FIG. 7 that the thickness of the electrode is increased with an increase in degree D of dispersion of the catalyst particles.

III. Power-generating Performance of Fuel Cell

An electrolyte membrane 2 having a thickness of 50 μm was formed using a sulfonated PEEK similar to that used in the production of the electrode. Two sets of the electrode examples (1) to (6) were prepared, and one of the sets was defined as examples (1) to (6) of the air electrodes 3, and the other set was defined as examples (1) to (6) of the fuel electrodes 4. The examples (1) to (6) of the air electrodes 3 and the examples (1) to (6) of the fuel electrodes 4 were combined, so that each of the examples (1) to (6) of the air electrodes 3 was paired with the examples (1) to (6) of the fuel electrodes 4. More specifically, as regards the example (1), the following combinations were made: a combination of the example (1) and the example (1); a combination of the example (1) and the example (2) . . . a combination of the example (1) and the example (5) and a combination of the example (1) and the example (6). In this manner, 36 sets of electrode pairs were compared. The electrolyte membrane 2 was sandwiched between each pair of electrodes, namely, each set of the air electrode 3 and the fuel electrode 4, and subjected to a hot pressing under conditions of 140° C., 1.5 MPa and one minute to produce a membrane electrode assembly 9. A solid polymer fuel cell 1 was assembled using each of the membrane electrode assemblies 9 and used to generate a power under a condition that the moistening was carried out from both of the side of the air electrode 3 and the side of the fuel electrode 4, and the relationship between the current density and the terminal voltage was measured. In this case, because a large influence was exerted to the terminal voltage due to the diffusion of water, a terminal voltage at a high current density of 0.8 A/cm² was used as a comparative value of terminal voltage of each cell.

Table 9 shows the ratio Wp/Wc of the incorporated weights, the combination of the air electrode and the fuel electrode in each cell and the terminal voltage at 0.8 A/cm² for the examples (1) to (6) of the air and fuel electrodes.

TABLE 9

| | | | Air electrode | | | | | |
| --- | --- | --- | --- | --- | --- | --- | --- | --- |
| | | Ratio Wp/Wc | Ex. 1 0.2 | Ex. 2 0.4 | Ex. 3 0.6 | Ex. 4 0.8 | Ex. 5 1.25 | Ex. 6 1.75 |
| Fuel electrode | Ex. 1 | 0.2 | 0.614 | 0.612 | 0.608 | 0.603 | 0.602 | 0.577 |
| | Ex. 2 | 0.4 | 0.616 | 0.682 | 0.681 | 0.678 | 0.672 | 0.597 |
| | Ex. 3 | 0.6 | 0.619 | 0.674 | 0.687 | 0.691 | 0.674 | 0.613 |
| | Ex. 4 | 0.8 | 0.621 | 0.668 | 0.682 | 0.688 | 0.682 | 0.618 |
| | Ex. 5 | 1.25 | 0.618 | 0.664 | 0.678 | 0.684 | 0.691 | 0.622 |
| | Ex. 6 | 1.75 | 0.619 | 0.647 | 0.648 | 0.649 | 0.642 | 0.615 |
| | | | Terminal voltage (V) | | | | | |

Ex. = Example

Figure 8:
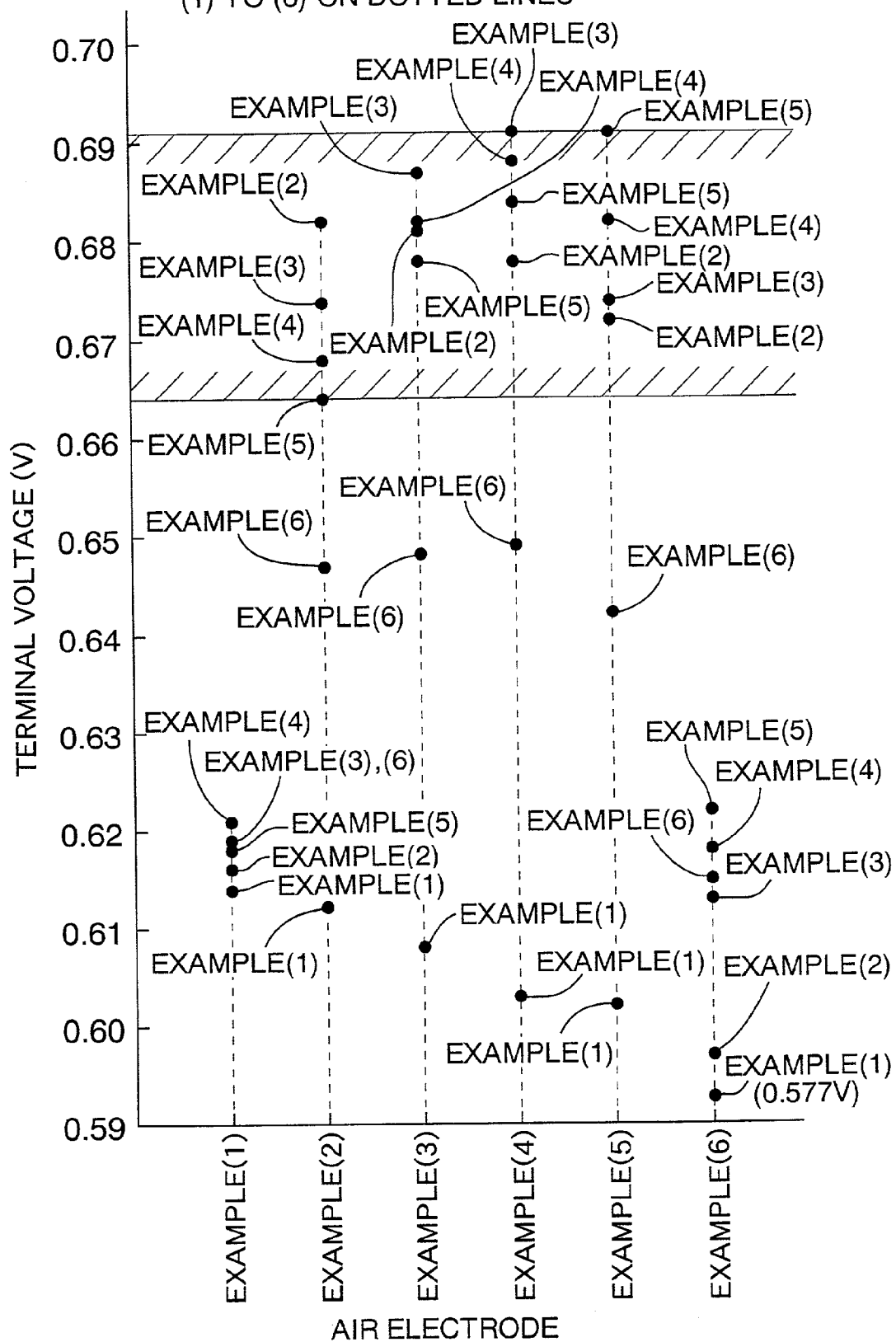
FIG. 8 is a graph showing a first example of the relationship between the combinations of air electrodes and fuel electrodes and the terminal voltage.

FIG. 8 is a graph made based on Table 9 and showing the relationship between the combination of the air and fuel electrodes 3 and 4 and the terminal voltage. As apparent from Table 9 and FIG. 8, if the combinations are made between the examples (2) to (5) of the air electrodes and the examples (2) to (5) of the fuel electrodes, the power-generating performance of each of the solid polymer fuel cells can be enhanced.

For comparison, a slurry was prepared by incorporating 20% by weight of PTFE particles having an average particle size of 10 μm into the slurry for the electrode described in EXAMPLE III. This slurry was applied to one surface of each of two porous carbon papers, so that the content of platinum (Pt) was 0.5 mg/cm$^2$. Then, the slurry was dried to provide an electrode as an example (7) having a weight ratio Wp/Wc of 0.6 and including a diffusion layer. The electrode as the example (7) had a thickness t of 15 μm, which was 9 μm larger than that of the electrode example (3) shown in Table 4.

A membrane electrode assembly 9 was fabricated in the same manner as that described above, using the two examples (7) as an air electrode 3 and a fuel electrode 4. A solid polymer fuel cell 1 was assembled using the membrane electrode assembly 9 and used to generate a power under conditions that the moistening was carried out from both of the side of the air electrode 3 and the side of the fuel electrode 4, and the relationship between the current density and the terminal voltage was measured. As a result, it was ascertained that the terminal voltage at a current density of 0.8 A/cm$^2$ was 0.643 V. It is clear that this terminal voltage is about 6% lower than the terminal voltage of 0.687 V in a case of the combination of the example (3) and the example (3) shown in Table 8.

From this fact, it is clear that the carbon black particles have such a water repellent property that an amount of water adsorbed under a saturated steam pressure at 60° was equal to or smaller than 80 cc/g, and the ratio Wp/Wc of the incorporated weights Wp and Wc is required to be in a range of $0.4 \leq Wp/Wc \leq 1.25$.

If the ratio Wp/Wc of the incorporated weights is set in such range, the thickness t of the electrode is in a range of $5 \mu m \leq t \leq 8 \mu m$ from Table 4; the rate Cc of coating of the catalyst particles is in a range of $91\% \leq Cc \leq 98\%$ from Table 6 and further, the degree D of dispersion of the catalyst particles is in a range of $3\% \leq D \leq 8\%$ from Table 6.

A solid polymer fuel cell 1 in the other embodiments can have a structure similar to that shown in FIG. 1. In this cell 1, however, the moistening can be carried out from only the side of an air electrode 3.

An electrolyte membrane 2 can be formed of a polymer ion-exchange component having a proton conductivity, e.g., an aromatic hydrocarbon polymer ion-exchange component in the embodiment. Each of the air electrode 3 and a fuel electrode 4 can be formed of a plurality of catalyst particles including Pt particles as catalyst metal particles carried on surfaces of carbon black particles, and a polymer ion-exchange component which can have a proton conductivity and a function as a binder, which can be the same as or different from the above-described polymer ion-exchange component, e.g., an aromatic hydrocarbon polymer ion-exchange component in the embodiment, and which does not contain PTFE particles as a third component.

Each of diffusion layers 5 and 6 can be formed of a porous carbon paper, a carbon plate or the like, and separators 7 and 8 can be formed of graphitized carbon to have the same shape. Air is supplied to a plurality of grooves 10 provided in the separator 7 located adjacent the air electrode 3, and hydrogen can be supplied to a plurality of grooves 11 provided in the separator 8 adjacent the fuel electrode 4 in an intersecting relation to the grooves 10.

The aromatic hydrocarbon polymer ion-exchange component can have such a nature that it is free of fluorine and soluble in a solvent. Examples of such polymer ion-exchange components which may be used are the various sulfonated aromatic hydrocarbon polymers shown in the above-described Table 1. Examples of solvents which may be used are polar solvents shown in the above-described Table 2.

The carbon black particles in the air electrode 3 on the moistening side can have such a water repellent property that an amount A of water adsorbed under a saturated steam pressure at 60° C. was equal to or smaller than 80 cc/g. If a weight of polymer ion-exchange component incorporated in the air electrode 3 is represented by Wp, and a weight of carbon black particles incorporated in the air electrode 3 is represented by Wc, the ratio Wp/Wc of the weight Wp to the weight Wc is set in a range of $0.2 \leq Wp/Wc \leq 0.8$.

On the other hand, the carbon black particles in the fuel electrode 4 can have such a hydrophilic nature that an amount A of water adsorbed under a saturated steam pressure at 60° C. is equal to or larger than 150 cc/g. If a weight of polymer ion-exchange component incorporated in the fuel electrode 4 is represented by Wp, and a weight of carbon black particles incorporated in the fuel electrode 4 is represented by Wc, the ratio Wp/Wc of the weight Wp to the weight Wc is set in a range of $0.6 \leq Wp/Wc \leq 1.25$.

With the above configuration, it is possible to provide each of the water-repellent carbon black particles and the hydrophilic carbon black particles with a function for adjusting the water retention of each of the air electrode 3 and the fuel electrode 4, thereby eliminating the need for PTFE particles. This is effective for reducing the thickness of each of the air electrode 3 and the fuel electrode 4.

If the ratio Wp/Wc of the weights Wp and Wc incorporated in each of the air electrode 3 and the fuel electrode 4 is set in the above-described range, the reduction in thickness of each of the air electrode 3 and the fuel electrode 4 due to no PTFE particles contained in each of the electrodes 3 and 4 can be promoted to enhance the proton conductivity, and the increase in resistance over-voltage can be inhibited to enhance power-generating performance.

Further, a moistening device may optionally be disposed only on the side of an air supply line and hence, it is possible to reduce the equipment cost and to simplify the structure.

In this case, if the moistening is carried out from the side of the air electrode 3, moistening water flows smoothly into the electrolyte membrane 2, because the carbon black particles in the air electrode 3 are water-repellent. In addition, the diffusion of water produced in the air electrode 3 back to the electrolyte membrane 2 also occurs and hence, the electrolyte membrane 2 is brought into a wet state. On the other hand, a portion of the water in the electrolyte membrane 2 flows into the fuel electrode 4 and is retained in the carbon black particles in the fuel electrode 4, because the carbon black particles in the fuel electrode 4 are hydrophilic. The electrolyte membrane 2 is maintained in the wet state by both of the retaining of the water in the fuel electrode 4 and the moistening of the air electrode 3. An excessive amount of water in each of the air electrode 3 and the fuel electrode 4 is discharged to the outside.

Particular examples will be described below.

I-(1). Production of Air Electrode

Platinum (Pt) particles were carried on carbon black particles (under a trade name of Vulcan XC-72) having a water repellent property such that an amount A of water adsorbed under a saturated steam pressure at 60° C. was equal to or lower than 72 cc/g, thereby preparing catalyst particles for an air electrode. The content of the Pt particles in the catalyst particles was 50% by weight.

EXAMPLE-I

Sulfonated PEEK shown as the example 1 in Table 1 was prepared as an aromatic hydrocarbon polymer ion-exchange component and dissolved under reflux in NMP shown in Table 2. The content of the sulfonated PEEK in the resulting solution was 6% by weight. The catalyst particles were mixed into the sulfonated PEEK-containing solution, so that a ratio Wp/Wc of the weight Wp of sulfonated PEEK incorporated to the weight Wc of carbon black particles incorporated was equal to 0.2. Then, the dispersion of the catalyst particles in the mixture was conducted using a ball mill to prepare a slurry for an air electrode. This slurry was applied to one surface of each of a plurality of porous carbon papers, so that the content of Pt was 0.5 mg/cm². The slurry was dried to provide an air electrode 3 having a diffusion layer 5. This air electrode 3 is referred to as example 10.

EXAMPLE-II

A process similar to that in EXAMPLE I was carried out, except that the ratio Wp/Wc of the weight Wp of sulfonated PEEK incorporated to the weight Wc of carbon black particles incorporated was set at 0.4, thereby producing an air electrode 3 having a diffusion layer 5. This air electrode 3 is referred to as example 11.

EXAMPLE-III

A process similar to that in EXAMPLE I was carried out, except that the ratio Wp/Wc of the weight Wp of sulfonated PEEK incorporated to the weight Wc of carbon black particles incorporated was set at 0.6, thereby producing an air electrode 3 having a diffusion layer 5. This air electrode 3 is referred to as example 12.

EXAMPLE-IV

A process similar to that in EXAMPLE I was carried out, except that the ratio Wp/Wc of the weight Wp of sulfonated PEEK incorporated to the weight Wc of carbon black particles incorporated was set at 0.8, thereby producing an air electrode 3 having a diffusion layer 5. This air electrode 3 is referred to as example 13.

EXAMPLE-V

A process similar to that in EXAMPLE I was carried out, except that the ratio Wp/Wc of the weight Wp of sulfonated PEEK incorporated to the weight Wc of carbon black particles incorporated was set at 1.25, thereby producing an air electrode 3 having a diffusion layer 5. This air electrode 3 is referred to as example 14.

EXAMPLE-VI

A process similar to that in EXAMPLE I was carried out, except that the ratio Wp/Wc of the weight Wp of sulfonated PEEK incorporated to the weight Wc of carbon black particles incorporated was set at 2.0, thereby producing an air electrode 3 having a diffusion layer 5. This air electrode 3 is referred to as example 15.

I-(2). Production of Fuel Electrode

Platinum (Pt) particles were carried on carbon black particles (under a trade name of Kecchen Black EC) having a hydrophilic property such that an amount A of water adsorbed under a saturated steam pressure at 60° C. was equal to 370 cc/g, thereby preparing catalyst particles for a fuel electrode. A content of Pt particles in the catalyst particles was 50% by weight.

EXAMPLE-I

The sulfonated PEEK shown as the example 1 in Table 1 was prepared as an aromatic hydrocarbon polymer ion-exchange component and dissolved under reflux in NMP shown in Table 2. A content of the sulfonated PEEK in the resulting solution was 6% by weight. The catalyst particles were mixed into the sulfonated PEEK-containing solution, so that the ratio Wp/Wc of the weight Wp of sulfonated PEEK incorporated to the weight Wc of carbon black particles incorporated was equal to 0.4. Then, the catalyst particles were dispersed in the sulfonated PEEK-containing solution using a ball mill to prepare a slurry for a fuel electrode. The slurry was applied onto one surface of each of a plurality of porous carbon papers, so that the content of Pt was 0.5 mg/cm². The slurry on each of the papers was then dried to provide a fuel electrode 4 having a diffusion layer 6. The fuel electrode 4 is referred to as example (10).

EXAMPLE II

A process similar to that in EXAMPLE I was carried out except that the ratio Wp/Wc of weight Wp of sulfonated PEEK incorporated to the weight Wc of carbon black particles incorporated was set at 0.6, thereby producing a fuel electrode 4 having a diffusion layer 6. The fuel electrode 4 is ref

EXAMPLE III

A process similar to that in EXAMPLE I was carried out except that the ratio Wp/Wc of weight Wp of sulfonated PEEK incorporated to the weight Wc of carbon black particles incorporated was set at 0.8, thereby producing a fuel electrode 4 having a diffusion layer 6. The fuel electrode 4 is referred to as example (12).

EXAMPLE IV

A process similar to that in EXAMPLE I was carried out except that the ratio Wp/Wc of weight Wp of sulfonated PEEK incorporated to the weight Wc of carbon black particles incorporated was set at 1.25, thereby producing a fuel electrode 4 having a diffusion layer 6. The fuel electrode 4 is referred to as example (13).

EXAMPLE V

A process similar to that in EXAMPLE I was carried out except that the ratio Wp/Wc of weight Wp of sulfonated PEEK incorporated to the weight Wc of carbon black particles incorporated was set at 1.75, thereby producing a fuel electrode 4 having a diffusion layer 6. The fuel electrode 4 is referred to as example (14).

II. Considerations Pertaining to Air Electrode and Fuel Electrode

Table 10 shows the relationship between the water retention and the ratio Wp/Wc of the weight Wp of sulfonated PEEK incorporated to the weight Wc of carbon black particles incorporated for the examples 10 to 15 of the air electrodes 3 and the examples (10) to (14) of the fuel electrodes 4. The water retention was calculated from an amount of water adsorbed under a saturated steam pressure at 60° C. by a gas adsorption device.

TABLE 10

| Air Electrode | | Ratio Wp/Wc of weights incorporated | Fuel Electrode | |
|---|---|---|---|---|
| | Water retention (%) | | Water retention (%) | |
| Example 10 | 48 | 0.2 | — | — |
| Example 11 | 51 | 0.4 | 58 | Example 10 |
| Example 12 | 52 | 0.6 | 63 | Example 11 |
| Example 13 | 54 | 0.8 | 65 | Example 12 |
| Example 14 | 57 | 1.25 | 68 | Example 13 |
| — | — | 1.75 | 72 | Example 14 |
| Example 15 | 61 | 2.0 | — | — |

Figure 9:
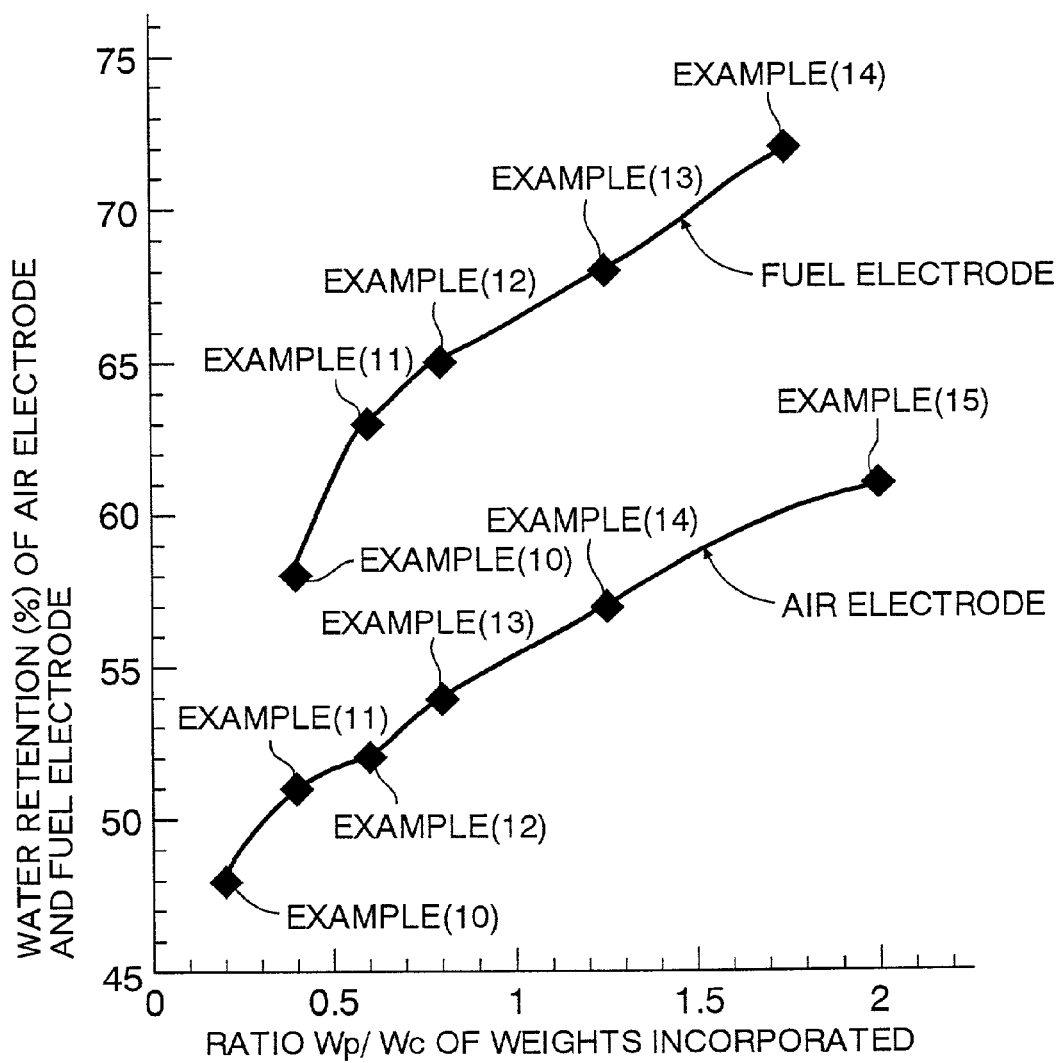
FIG. 9 is a graph showing a second example of the relationship between the ratio Wp/Wc of weights incorporated and the water retention of each of air and fuel electrodes.

FIG. 9 is a graph made based on Table 10 and showing the ratio Wp/Wc of the weights incorporated and the water retentions of the air electrode and the fuel electrode. In FIG. 9, the examples 10 to 15 correspond to the air electrodes, and the examples 10 to 14 correspond to the fuel electrodes. This applies to Figures which will be described hereinafter. It can be seen from FIG. 9 that the air electrode made using water-repellent carbon particles is lower in water retention than the fuel electrode made using hydrophilic carbon particles, if the ratios Wp/Wc of the weights incorporated in the air electrode and the fuel ELECTRODES are equal to each other. Each of the air electrode and the fuel electrode shows a tendency that if the ratio Wp/Wc of the weights incorporated is increased, the water retention is also increased.

Table 11 shows the relationship between the ratio Wp/Wc of the weights incorporated and the thickness of each of the air electrode 3 and the fuel electrode 4 for the examples 10 to 15 of the air electrodes 3 and the examples 10 to 14 of the fuel electrodes 4.

TABLE 11

| Air electrode | Fuel electrode | Ratio Wp/Wc of weight incorporated | Thickness (μm) of air electrode and fuel electrode |
|---|---|---|---|
| Example 10 | — | 0.2 | 3 |
| Example 11 | Example 10 | 0.4 | 5 |
| Example 12 | Example 11 | 0.6 | 6 |
| Example 13 | Example 12 | 0.8 | 7 |
| Example 14 | Example 13 | 1.25 | 8 |
| — | Example 14 | 1.75 | 9 |
| Example 15 | — | 2.0 | 9 |

Figure 10:
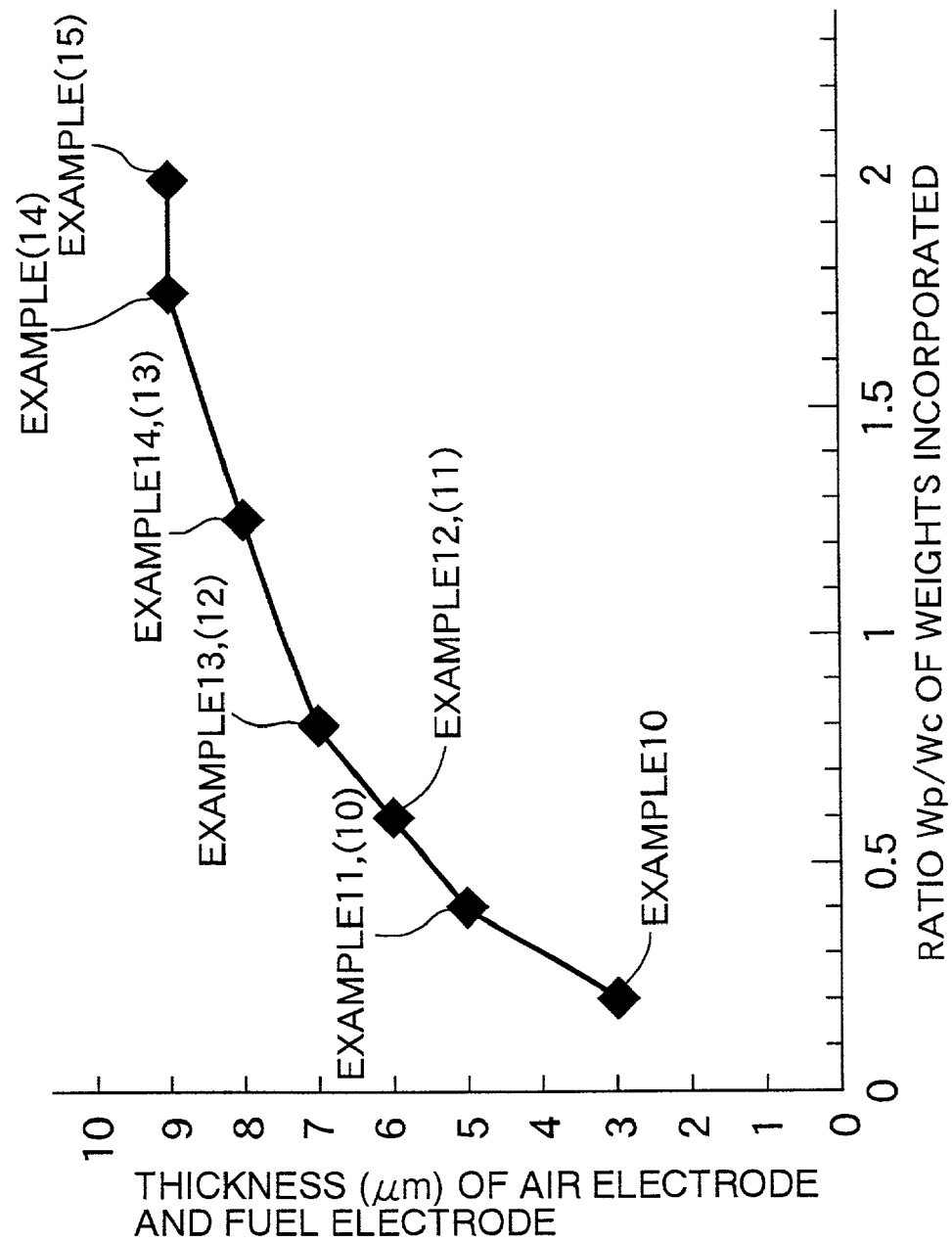
FIG. 10 is a graph showing a second example of the relationship between the ratio Wp/Wc of weights incorporated and the thickness of each of the air and fuel electrodes.

FIG. 10 is a graph made based on Table 11 and showing the relationship between the ratio Wp/Wc of the weights incorporated and the thickness of each of the air electrode and the fuel electrode. It can be seen from FIG. 10 that the thickness of each of the air electrode and the fuel electrode is increased with an increase in ratio Wp/Wc.

Table 12 shows the relationship between the ratio Wp/Wc of the weights incorporated and the rate Cc of coating of the catalyst particles for the examples 10 to 15 of the air electrodes 3 and the Examples 10 to 14 of the fuel electrodes 4.

TABLE 12

| Air electrode | Fuel electrode | Ratio Wp/Wc of weights incorporated | Rate Cc (%) of coating of catalyst particles |
|---|---|---|---|
| Example 10 | — | 0.2 | 72 |
| Example 11 | Example 10 | 0.4 | 91 |
| Example 12 | Example 11 | 0.6 | 95 |
| Example 13 | Example 12 | 0.8 | 97 |
| Example 14 | Example 13 | 1.25 | 98 |
| — | Example 14 | 1.75 | 98 |
| Example 15 | — | 2.0 | 98 |

The rate Cc of coating of the catalyst particles was determined likewise according to the following equation:

$Cc=\{(Ae-Ac)/Ae\}\times 100$ (%), wherein Ae represents an area of a plane of each of the air electrode and the fuel electrode, and Ac represents a sum of areas of the catalyst particles exposed on the plane of each of the air electrode and the fuel electrode.

Figure 11:
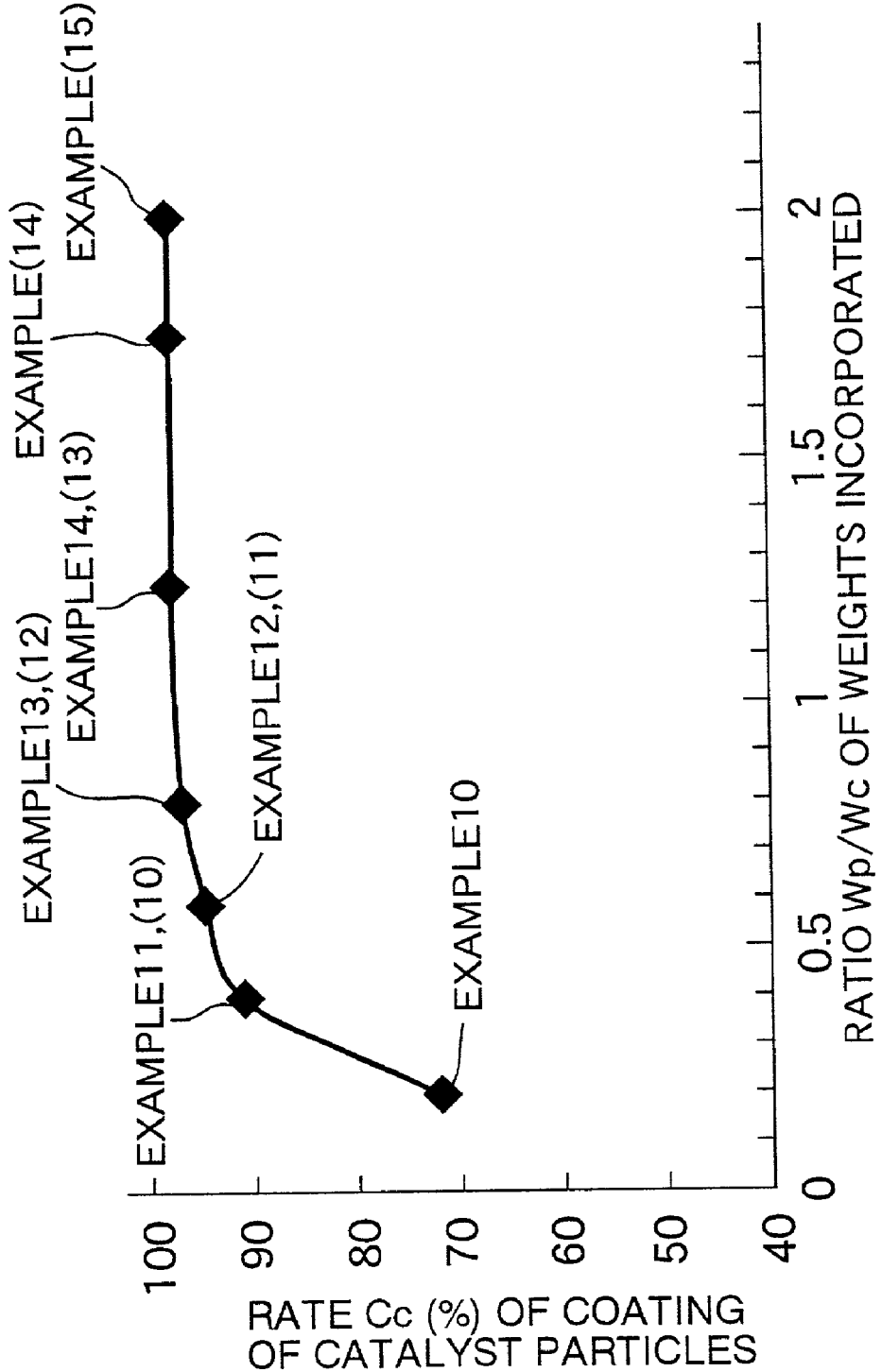
FIG. 11 is a graph showing a second example of the relationship between the ratio Wp/Wc of weights incorporated and the rate Cc of coating of catalyst particles.

FIG. 11 is a graph made based on Table 12 and showing the relationship between the ratio Wp/Wc of the weights incorporated and the rate Cc of coating of the catalyst particles. It can be seen from FIG. 11 that the rate Cc of coating of the catalyst particles is increased with an increase in ratio Wp/Wc.

Table 13 shows the relationship between the ratio Wp/Wc of the weights incorporated and the degree D of dispersion of the catalyst particles for the examples 10 to 15 of the air electrodes 3 and the examples 10 to 14 of the fuel electrodes 4.

TABLE 13

| Air electrode | Fuel electrode | Ratio Wp/Wc of weights incorporated | Degree D (%) of dispersion of catalyst particles |
|---|---|---|---|
| Example 10 | — | 0.2 | 2 |
| Example 11 | Example 10 | 0.4 | 3 |
| Example 12 | Example 11 | 0.6 | 5 |
| Example 13 | Example 12 | 0.8 | 7 |
| Example 14 | Example 13 | 1.25 | 8 |
| — | Example 14 | 1.75 | 9 |
| Example 15 | — | 2.0 | 9 |

The degree D of dispersion of the catalyst particles was determined likewise in the following manner. First, a theoretical concentration Tp of platinum (Pt) in the catalyst particles and a theoretical concentration Ts of sulfur (S) in the sulfonated PEEK were calculated from the amounts of sulfonated PEEK and catalyst particles incorporated at the time of the manufacture of the air electrode 3 (or the fuel electrode 4), and a theoretic ratio Ts/Tp was then determined from such theoretic values Tp and Ts. The surface of each of the air electrode 3 and the fuel electrode 4 was observed by EPMA, and an actual concentration Ap of Pt in the catalyst particles and an actual concentration of S in the sulfonated PEEK were determined by a surface analysis, and an actual ratio As/Ap was determined from such actual values As and Ap.

Thereafter, a degree D of dispersion of the catalyst particles was determined according to the following equation:

$$D=[\{(Ts/Tp)-(As/Ap)\}/(Ts/Tp)]\times 100 \text{ (\%)}$$

Figure 12:
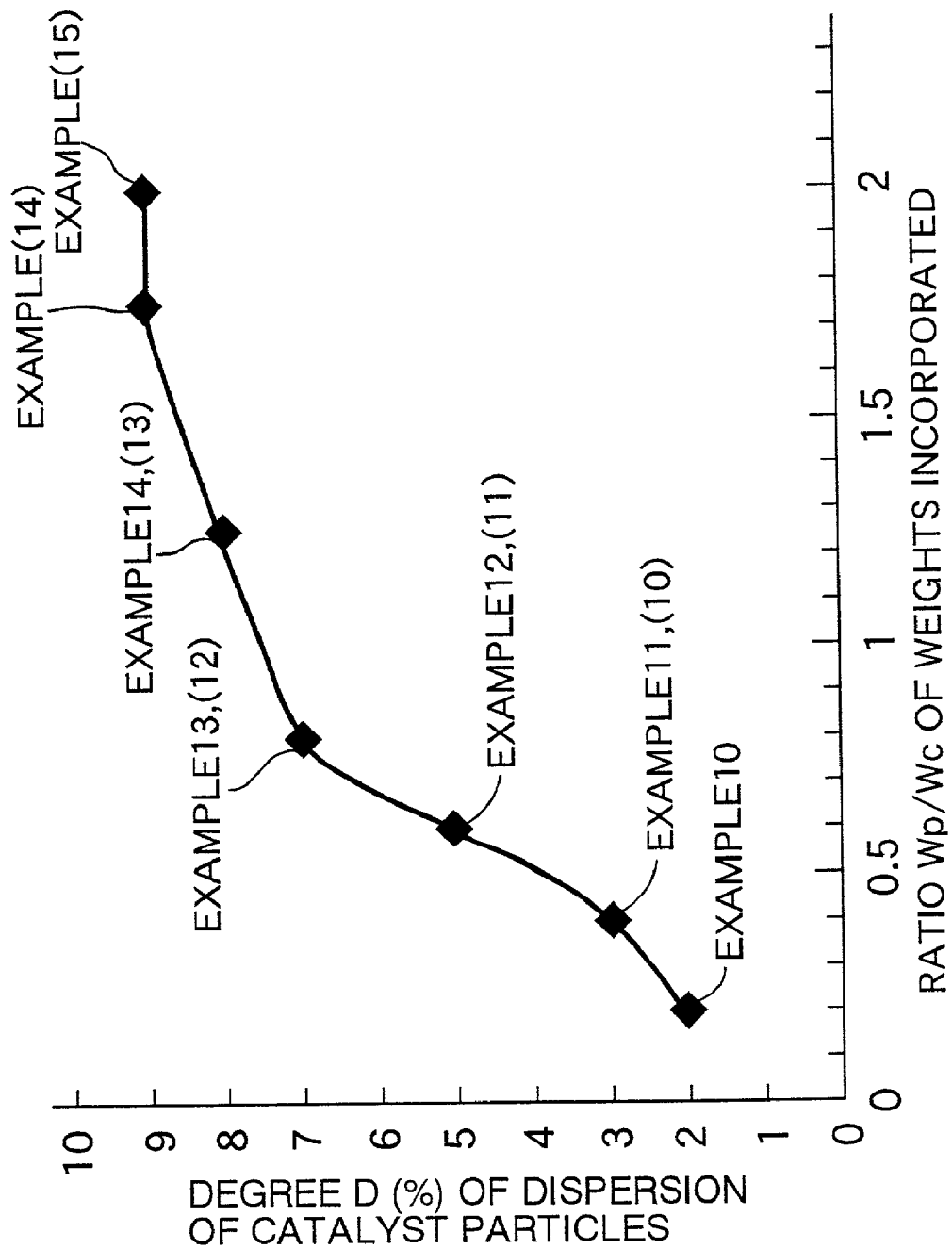
FIG. 12 is a graph showing a second example of the relationship between the ratio Wp/Wc of weights incorporated and the degree D of dispersion of the catalyst particles.

FIG. 12 is a graph made based on Table 13 and showing the relationship between the ratio Wp/Wc of the incorporated weights and the degree D of dispersion of the catalyst particles. It can be seen from FIG. 12 that the degree D of dispersion of the catalyst particles is increased with an increase in ratio Wp/Wc.

Table 14 shows the relationship between the degree D of dispersion of the catalyst particles and the thickness of each of the air electrode 3 and the fuel electrode 4.

TABLE 14

| Air electrode | Fuel electrode | Degree D (%) of dispersion of catalyst particles | Thickness (μm) of each of air electrode and fuel electrode |
|---|---|---|---|
| Example 10 | — | 2 | 3 |
| Example 11 | Example 10 | 3 | 5 |
| Example 12 | Example 11 | 5 | 6 |
| Example 13 | Example 12 | 7 | 7 |
| Example 14 | Example 13 | 8 | 8 |
| Example 15 | Example 14 | 9 | 9 |

Figure 13:
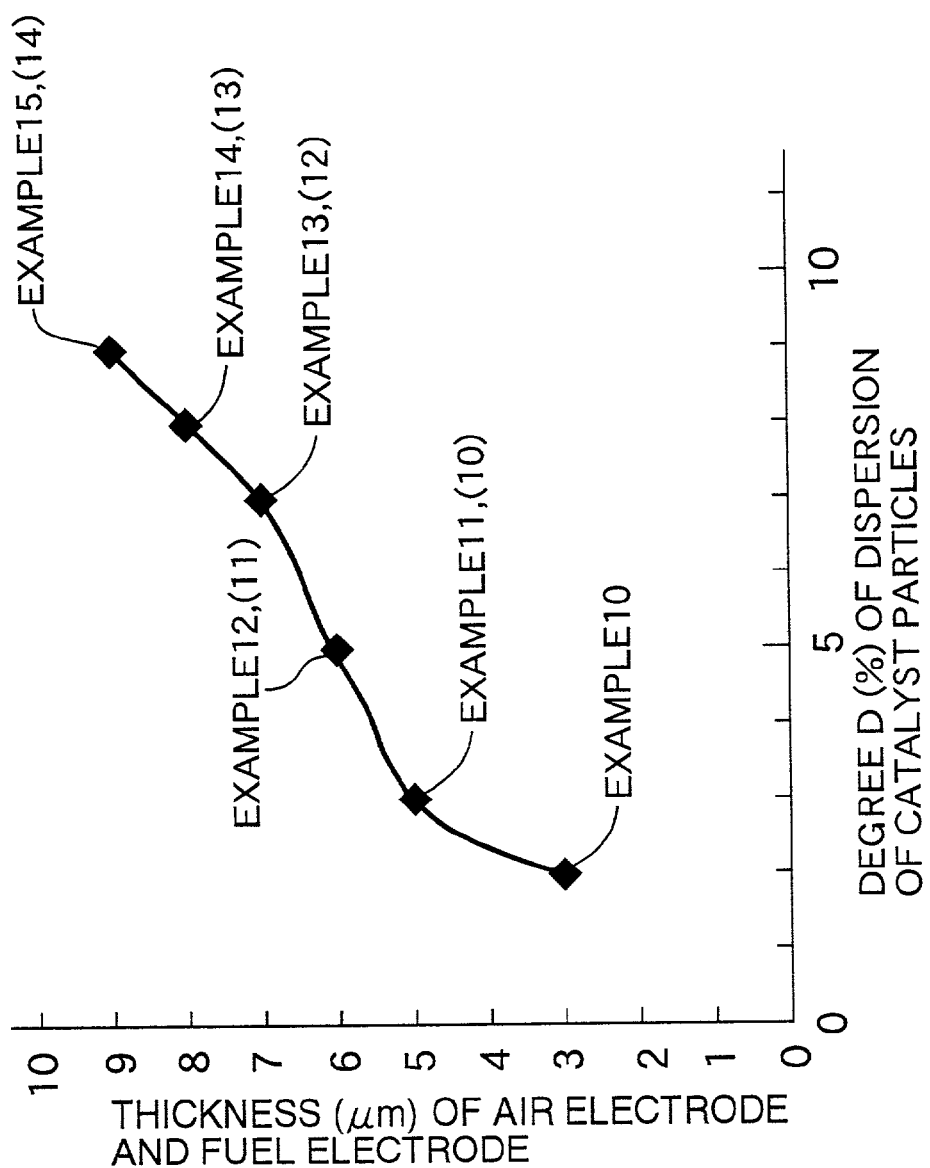
FIG. 13 is a graph showing a second example of the relationship between the degree D of dispersion of the catalyst particles and the thickness of each of the air and fuel electrodes.

FIG. 13 is a graph made based on Table 14 and showing the relationship between the degree D of dispersion of the catalyst particles and the thickness of each of the air electrode and the fuel electrode. It can be seen from FIG. 13 that the thickness of each of the air electrode and the fuel electrode is increased with an increase in dispersion D of the catalyst particles.

III. Power-generating Performance of Fuel Cell

An electrolyte membrane 2 having a thickness of 50 μm was formed using sulfonated PEEK similar to that used in the production of the air electrode 3 and the fuel electrode 4. The examples 10 to 15 of the air electrodes 3 and the examples 10 to 14 of the fuel electrodes 4 were combined, so that each of the examples 10 to 15 of the air electrodes 3 was paired with the examples 10 to 14 of the fuel electrodes 4. More specifically, as regards the example 10, the following combinations were made: a combination of the example 10 and the example 10; a combination of the example 10 and the example 11 . . . a combination of the example 10 and the example 14. In this manner, 30 sets of electrode pairs were compared. The electrolyte membrane 2 was sandwiched between each pair of electrodes, namely, each set of the air electrode 3 and the fuel electrode 4, and subjected to a hot pressing under conditions of 140° C., 1.5 MPa and one minute to produce a membrane electrode assembly 9. A solid polymer fuel cell 1 was assembled using each of the membrane electrode assemblies 9 and used to generate a power under a condition that the moistening was carried out from only the side of the air electrode 3, and the relationship between the current density and the terminal voltage was measured. In this case, because a large influence was exerted to the terminal voltage due to the diffusion of water, a terminal voltage at a high current density of 0.8 A/cm² was likewise used as a comparative value of terminal voltage of each cell.

Table 15 shows the ratio Wp/Wc of the incorporated weights, the combination of the air electrode and the fuel electrode in each cell and the terminal voltage at 0.8 A/cm² for the examples 10 to 15 of the air electrodes 3 and the examples 10 to 14 of the fuel electrodes 4.

TABLE 15

| | | Air electrode | | | | | |
|---|---|---|---|---|---|---|---|
| | | Ex. 10 | Ex. 11 | Ex. 12 | Ex. 13 | Ex. 14 | Ex. 15 |
| | Ratio Wp/Wc | 0.2 | 0.4 | 0.6 | 0.8 | 1.25 | 2.0 |
| Fuel electrode | Ex. 10 0.4 | 0.638 | 0.612 | 0.608 | 0.603 | 0.602 | 0.577 |
| | Ex. 11 0.6 | 0.658 | 0.682 | 0.674 | 0.658 | 0.614 | 0.597 |
| | Ex. 12 0.8 | 0.664 | 0.674 | 0.691 | 0.672 | 0.621 | 0.613 |
| | Ex. 13 1.25 | 0.658 | 0.668 | 0.689 | 0.686 | 0.638 | 0.622 |
| | Ex. 14 1.75 | 0.648 | 0.652 | 0.654 | 0.649 | 0.642 | 0.637 |
| | | Terminal voltage (V) | | | | | |

Ex. = Example

Figure 14:
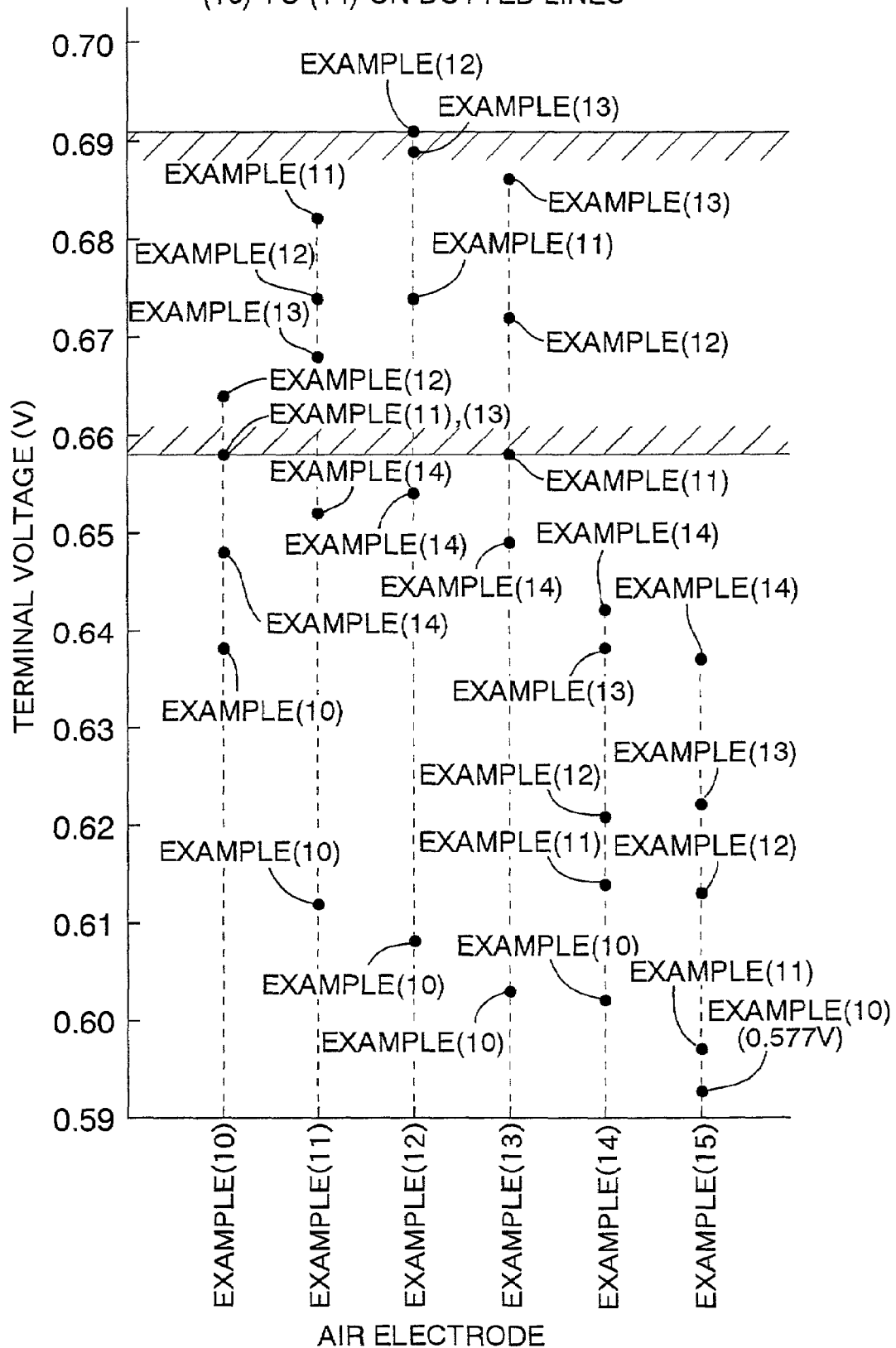
FIG. 14 is a graph showing a second example of the relationship between the combinations of air electrodes and fuel electrodes and the terminal voltage.

FIG. 14 is a graph made based on Table 15 and showing the relationship between the combination of the examples 10 to 15 of the air electrodes and the examples 10 to 14 of the fuel electrodes 4 and the terminal voltage. As apparent from Table 15 and FIG. 14, if the combinations are made between the examples 10 to 13 of the air electrodes and the examples 11 to 13 of the fuel electrodes 4, the power-generating performance of the solid polymer fuel cell 1 can be enhanced when the solid polymer fuel cell 1 is operated under a condition that the moistening is carried out from only the side of the air electrode 3.

For comparison, in the fuel cell 1 made using the combination of the example 12 of the air electrode 3 and the example 12 of the fuel electrode 4, a power was generated under the condition that the moistening was carried out from only the side of the air electrode 3, and the relationship between the current density and the terminal voltage was measured. As a result, it was ascertained that the terminal voltage at a current density of 0.8 A/cm² was 0.618 V. It is clear that this terminal voltage is about 10% lower than the terminal voltage of 0.691 provided in a case of the combination of the example 12 of the air electrode and the example 12 of the fuel electrode 4 shown in Table 15.

From this fact, it is clear that moistening can be carried out from only the side of the air electrode in each of the fuel cells 1 made using the combinations of the examples 10 to 13 of the air electrodes 3 and the examples 11 to 13 of the fuel electrodes 4.

If the ratio Wp/Wc of the incorporated weights is set in the above-described range in each of the air electrode 3 and the fuel electrode 4, the thickness t of the air electrode 3 is in a range of 3 μm≦t≦7 μm from Table 11, as in the examples 10 to 13, and the thickness t of the fuel electrode 4 is in a range of 6 μm≦t≦8 μm from Table 12, as in the examples 11 to 13. In addition, the rate Cc of coating of the catalyst particles in the air electrode 3 is in a range of 72%≦Cc≦97% from Table 12, as in the examples 10 to 13, and the rate Cc of coating of the catalyst particles in the fuel electrode 4 is in a range of 95%≦Cc≦98% from Table 12, as in the examples 11 to 13. Further, the degree D of dispersion of the catalyst particles in the air electrode 3 is in a range of 2%≦D≦7% from Table 13, as in the examples 10 to 13, and the degree D of dispersion of the catalyst particles in the fuel electrode 4 is in a range of 5%≦D≦8% from Table 13, as in the examples 11 to 13.

A solid polymer fuel cell 1 in other embodiments of this invention can have a structure similar to that shown in FIG. 1. In this cell 1, however, the moistening can be carried out from only the side of a fuel electrode 4.

An electrolyte membrane 2 can be formed of a polymer ion-exchange component having a proton conductivity, e.g., an aromatic hydrocarbon polymer ion-exchange component in the embodiment. Each of the air electrode 3 and a fuel electrode 4 can be formed of a plurality of catalyst particles including Pt particles as catalyst metal particles carried on surfaces of carbon black particles, and a polymer ion-exchange component which can have a proton conductivity and a function as a binder, which can be the same as or different from the above-described polymer ion-exchange component, e.g., an aromatic hydrocarbon polymer ion-exchange component in the embodiment, and which does not contain PTFE particles as a third component.

Each of diffusion layers 5 and 6 can be formed of a porous carbon paper, a carbon plate or the like, and separators 7 and 8 can be formed of graphitized carbon to have the same shape. Air can be supplied to a plurality of grooves 10 provided in the separator 7 located adjacent the air electrode 3, and hydrogen can be supplied to a plurality of grooves 11 provided in the separator 8 adjacent the fuel electrode 4 in an intersecting relation to the grooves 10.

The aromatic hydrocarbon polymer ion-exchange component can have such a nature that it is free of fluorine and soluble in a solvent. Examples of such polymer ion-exchange components which may be used are the various sulfonated aromatic hydrocarbon polymers shown in the above-described Table 1. Examples of solvents which may be used are polar solvents shown in the above-described Table 2.

The carbon black particles in the fuel electrode 4 on the moistening side can have such a water repellent property that an amount A of water adsorbed under a saturated steam pressure at 60° C. was equal to or smaller than 80 cc/g. If a weight of polymer ion-exchange component incorporated in the fuel electrode 4 is represented by Wp, and a weight of carbon black particles incorporated in the fuel electrode 4 is represented by Wc, the ratio Wp/Wc of the weight Wp to the weight Wc is set in a range of $0.2 \leq Wp/Wc \leq 0.8$.

On the other hand, the carbon black particles in the air electrode 3 can have such a hydrophilic nature that an amount A of water adsorbed under a saturated steam pressure at 60° C. is equal to or larger than 150 cc/g. If a weight of polymer ion-exchange component incorporated in the air electrode 3 is represented by Wp, and a weight of carbon black particles incorporated in the air electrode 3 is represented by Wc, the ratio Wp/Wc of the weight Wp to the weight Wc is set in a range of $0.6 \leq Wp/Wc \leq 1.25$.

With the above configuration, it is possible to provide each of the water-repellent carbon black particles and the hydrophilic carbon black particles with a function for adjusting the water retention of each of the air electrode 3 and the fuel electrode 4, thereby disusing PTFE particles. This is effective for reducing the thickness of each of the air electrode 3 and the fuel electrode 4.

If the ratio Wp/Wc of the weights Wp and Wc incorporated in each of the air electrode 3 and the fuel electrode 4 is set in the above-described range, the reduction in thickness of each of the air electrode 3 and the fuel electrode 4 due to no PTFE particles contained in each of the electrodes 3 and 4 can be promoted to enhance the proton conductivity, and the increase in resistance over-voltage can be inhibited to enhance power-generating performance.

Further, a moistening device may be disposed only on the side of an air supply line and hence, it is possible to reduce the equipment cost and to simplify the structure.

In this case, if the moistening is carried out from the side of the fuel electrode 4, moistening water flows smoothly into the electrolyte membrane 2, because the carbon black particles in the fuel electrode 4 are water-repellent. In addition, the diffusion of water produced in the air electrode 3 back to the electrolyte membrane 2 also occurs and hence, the electrolyte membrane 2 is brought into a wet state. On the other hand, a portion of water produced and a portion of the water flowing out of the electrolyte membrane 2 into the air electrode 3 are retained in the carbon black particles in the fuel electrode 4, because the carbon black particles in the air electrode 3 are hydrophilic. The electrolyte membrane 2 is maintained in the wet state by both of the retaining of the water in the air electrode 4 and the moistening of the fuel electrode 4. An excessive amount of water in each of the air electrode 3 and the fuel electrode 4 is discharged to the outside.

Particular examples will be described below.

I-(1). Production of Fuel Electrode

Platinum (Pt) particles were carried on carbon black particles (under a trade name of Vulcan XC-72) having a water repellent property such that an amount A of water adsorbed under a saturated steam pressure at 60° C. was equal to or lower than 72 cc/g, thereby preparing catalyst particles for a fuel electrode. The content of the Pt particles in the catalyst particles was 50% by weight.

EXAMPLE-I

Sulfonated PEEK shown as the example 1 in Table 1 was prepared as an aromatic hydrocarbon polymer ion-exchange component and dissolved under reflux in NMP shown in Table 2. The content of the sulfonated PEEK in the resulting solution was 6% by weight. The catalyst particles were mixed into the sulfonated PEEK-containing solution, so that a ratio Wp/Wc of the weight Wp of sulfonated PEEK incorporated to the weight Wc of carbon black particles incorporated was equal to 0.2. Then, the dispersion of the catalyst particles in the mixture was conducted using a ball mill to prepare a slurry for a fuel electrode. This slurry was applied to one surface of each of a plurality of porous carbon papers, so that the content of Pt was 0.5 mg/cm². The slurry was dried to provide a fuel electrode 4 having a diffusion layer 6. This fuel electrode 4 is referred to as example 20.

EXAMPLE-II

A process similar to that in EXAMPLE I was carried out, except that the ratio Wp/Wc of the weight Wp of sulfonated PEEK incorporated to the weight Wc of carbon black particles incorporated was set at 0.4, thereby producing a fuel electrode 4 having a diffusion layer 6. This fuel electrode 4 is referred to as example 21.

EXAMPLE-III

A process similar to that in EXAMPLE I was carried out, except that the ratio Wp/Wc of the weight Wp of sulfonated PEEK incorporated to the weight Wc of carbon black particles incorporated was set at 0.6, thereby producing a fuel electrode 4 having a diffusion layer 6. This fuel electrode 4 is referred to as example 22.

EXAMPLE-IV

A process similar to that in EXAMPLE I was carried out, except that the ratio Wp/Wc of the weight Wp of sulfonated PEEK incorporated to the weight Wc of carbon black particles incorporated was set at 0.8, thereby producing a fuel electrode 4 having a diffusion layer 6. This fuel electrode 4 is referred to as example 23.

EXAMPLE-V

A process similar to that in EXAMPLE I was carried out, except that the ratio Wp/Wc of the weight Wp of sulfonated PEEK incorporated to the weight Wc of carbon black particles incorporated was set at 1.25, thereby producing a fuel electrode 4 having a diffusion layer 6. This fuel electrode 4 is referred to as example 24.

EXAMPLE-VI

A process similar to that in EXAMPLE I was carried out, except that the ratio Wp/Wc of the weight Wp of sulfonated PEEK incorporated to the weight Wc of carbon black particles incorporated was set at 2.0, thereby producing a fuel electrode 4 having a diffusion layer 6. This fuel electrode 4 is referred to as example 25.

I-(2). Production of Air Electrode

Platinum (Pt) particles were carried on carbon black particles (under a trade name of Kecchen Black EC) having a hydrophilic property such that an amount A of water adsorbed under a saturated steam pressure at 60° C. was equal to 370 cc/g, thereby preparing catalyst particles for an air electrode. A content of Pt particles in the catalyst particles was 50% by weight.

EXAMPLE-I

The sulfonated PEEK shown as the example 1 in Table 1 was prepared as an aromatic hydrocarbon polymer ion-exchange component and dissolved under reflux in NMP shown in Table 2. A content of the sulfonated PEEK in the resulting solution was 6% by weight. The catalyst particles were mixed into the sulfonated PEEK-containing solution, so that the ratio Wp/Wc of the weight Wp of sulfonated PEEK incorporated to the weight Wc of carbon black particles incorporated was equal to 0.4. Then, the catalyst particles were dispersed in the sulfonated PEEK-containing solution using a ball mill to prepare a slurry for an air electrode. The slurry was applied onto one surface of each of a plurality of porous carbon papers, so that the content of Pt was 0.5 mg/cm². The slurry on each of the papers was then dried to provide an air electrode 3 having a diffusion layer 5. The air electrode 3 is referred to as example (20).

EXAMPLE-II

A process similar to that in EXAMPLE I was carried out except that the ratio Wp/Wc of weight Wp of sulfonated PEEK incorporated to the weight Wc of carbon black particles incorporated was set at 0.6, thereby producing an air electrode 3 having a diffusion layer 5. The air electrode 3 is referred to as example (21).

EXAMPLE-III

A process similar to that in EXAMPLE I was carried out except that the ratio Wp/Wc of weight Wp of sulfonated PEEK incorporated to the weight Wc of carbon black particles incorporated was set at 0.8, thereby producing an air electrode 3 having a diffusion layer 5. The air electrode 3 is referred to as example (22).

EXAMPLE-IV

A process similar to that in EXAMPLE I was carried out except that the ratio Wp/Wc of weight Wp of sulfonated PEEK incorporated to the weight Wc of carbon black particles incorporated was set at 1.25, thereby producing an air electrode 3 having a diffusion layer 5. The air electrode 3 is referred to as example (23).

EXAMPLE-V

A process similar to that in EXAMPLE I was carried out except that the ratio Wp/Wc of weight Wp of sulfonated PEEK incorporated to the weight Wc of carbon black particles incorporated was set at 1.75, thereby producing an air electrode 3 having a diffusion layer 5. The air electrode 3 is referred to as example (24).

II. Considerations Pertaining to Air Electrode and Fuel Electrode

Table 16 shows the relationship between the ratio Wp/Wc of weight Wp of sulfonated PEEK incorporated to the weight Wc of carbon black particles incorporated and the water-retention for the examples (20) to (25) of the fuel electrodes 4 and the examples (20) to (24) of the air electrodes 3. The water retention was calculated from the amount of water adsorbed under the saturated steam pressure at 60° C. by a gas adsorption device.

TABLE 16

| Fuel electrode | | Ratio Wp/Wc | Air electrode | |
| --- | --- | --- | --- | --- |
| | Water retention (%) | of weights incorporated | Water retention (%) | |
| Example 20 | 48 | 0.2 | — | — |
| Example 21 | 51 | 0.4 | 58 | Example 20 |
| Example 22 | 52 | 0.6 | 63 | Example 21 |
| Example 23 | 54 | 0.8 | 65 | Example 22 |
| Example 24 | 57 | 1.25 | 68 | Example 23 |
| — | — | 1.75 | 72 | Example 24 |
| Example 25 | 61 | 2.0 | — | — |

Figure 15:
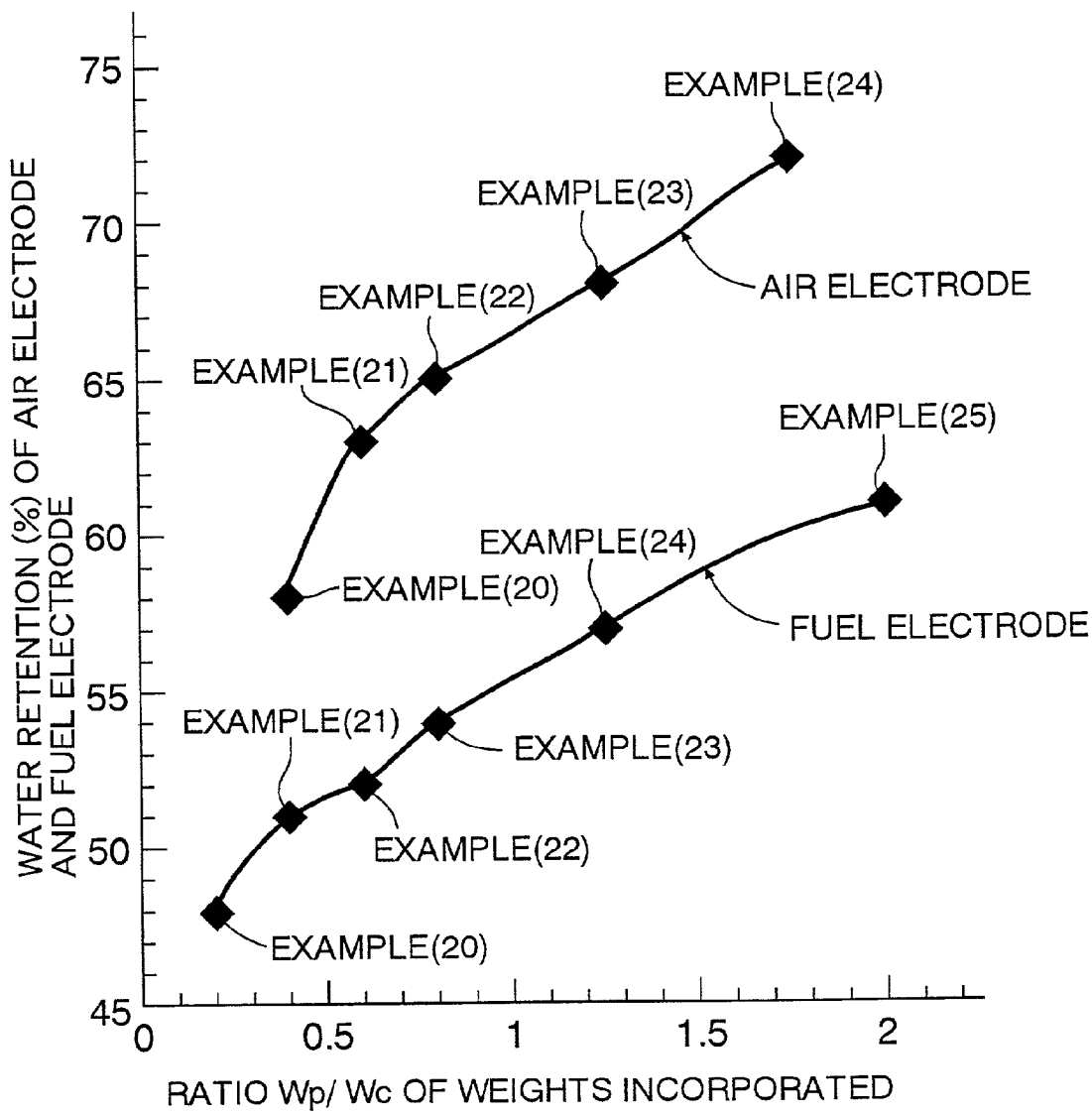
FIG. 15 is a graph showing a third example of the relationship between the ratio Wp/Wc of weights incorporated and the water retention of each of air and fuel electrodes.

FIG. 15 is a graph made based on Table 16 and showing the relationship between the ratio Wp/Wc of weights incorporated and the water retention of each of the air electrode and the fuel electrode. In FIG. 15, the examples 20 to 25 correspond to the fuel electrodes, and the examples 20 to 24 correspond to the air electrodes. This applies to Figures which will be described hereinafter. It can be seen from FIG. 15 that the fuel electrode made using the water-repellent carbon particles is lower in water retention than the air electrode made using the hydrophilic carbon particles, if the ratios Wp/Wc of the weights of carbon particles in the fuel and air electrodes are equal to each other. Each of the air electrode and the fuel electrode shows a tendency that if the ratio Wp/Wc of the weights incorporated is increased, the water retention is also increased.

Table 17 shows the relationship between the ratio Wp/Wc of the weights incorporated and the thickness of each of the air electrode 3 and the fuel electrode 4 for the examples 20 to 25 of the fuel electrodes 4 and the examples 20 to 24 of the air electrodes 3.

TABLE 17

| Fuel electrode | Air electrode | Ratio Wp/Wc of weights incorporated | Thickness (μm) of air electrode and fuel electrode |
|---|---|---|---|
| Example 20 | — | 0.2 | 3 |
| Example 21 | Example 20 | 0.4 | 5 |
| Example 22 | Example 21 | 0.6 | 6 |
| Example 23 | Example 22 | 0.8 | 7 |
| Example 24 | Example 23 | 1.25 | 8 |
| — | Example 24 | 1.75 | 9 |
| Example 25 | — | 2.0 | 9 |

Figure 16:
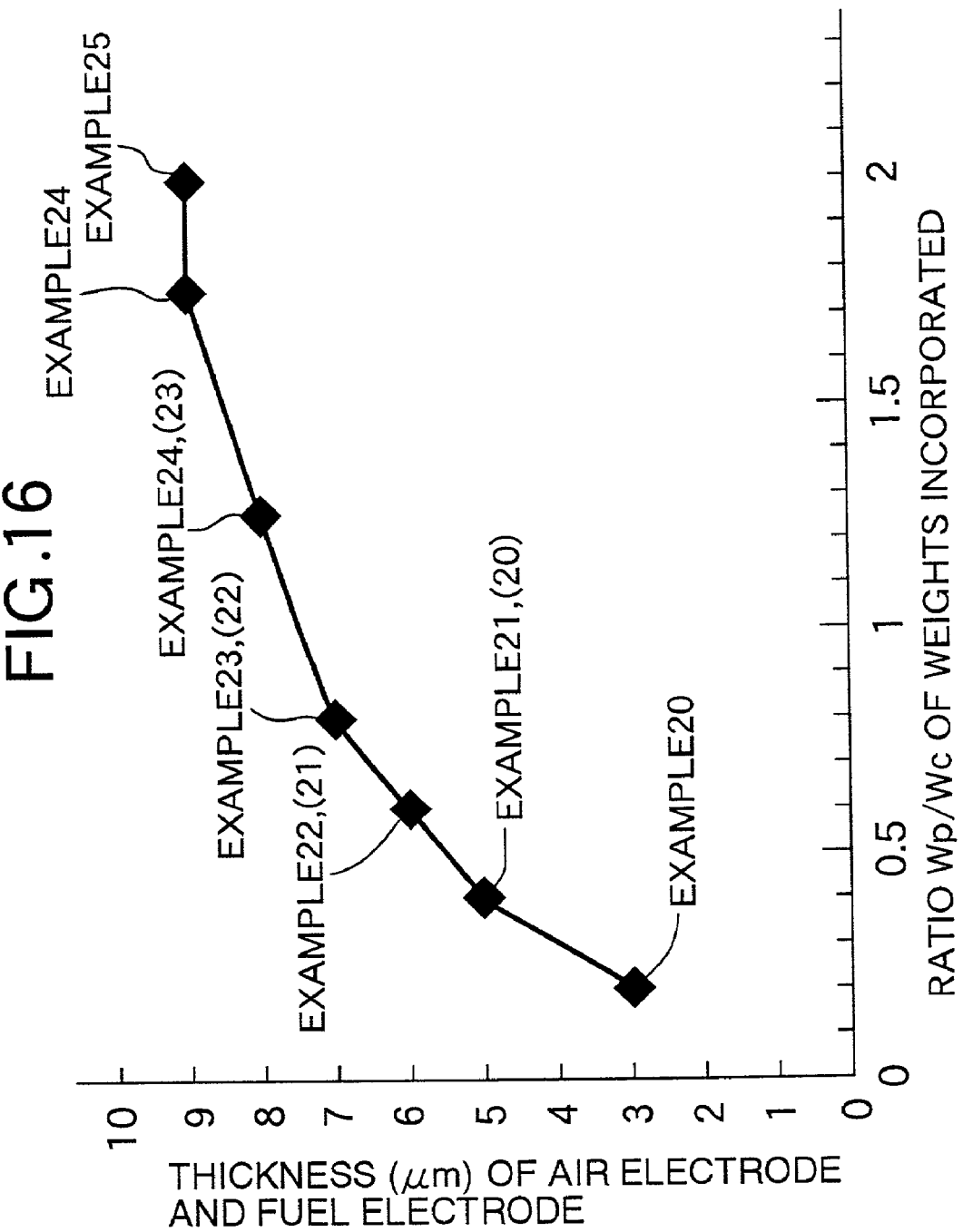
FIG. 16 is a graph showing a third example of the relationship between the ratio Wp/Wc of weights incorporated and the thickness of each of the air and fuel electrodes.

FIG. 16 is a graph made based on Table 17 and showing the relationship between the ratio Wp/Wc of the weights incorporated and the thickness of each of the air electrode and the fuel electrode. It can be seen from FIG. 16 that the thickness of each of the air electrode and the fuel electrode is increased with an increase in ratio Wp/Wc.

Table 18 shows the relationship between the ratio Wp/Wc of the weights incorporated and the rate Cc of coating of the catalyst particles for the examples 20 to 25 of the fuel electrodes 4 and the examples 20 to 24 of the air electrodes 3.

TABLE 18

| Fuel electrode | Air electrode | Ratio Wp/Wc of weights incorporated | Rate Cc (%) of coating of catalyst particles |
|---|---|---|---|
| Example 20 | — | 0.2 | 72 |
| Example 21 | Example 20 | 0.4 | 91 |
| Example 22 | Example 21 | 0.6 | 95 |
| Example 23 | Example 22 | 0.8 | 97 |
| Example 24 | Example 23 | 1.25 | 98 |
| — | Example 24 | 1.75 | 98 |
| Example 25 | — | 2.0 | 98 |

The rate Cc of coating of the catalyst particles was determined likewise according to the following equation:

$Cc = \{(Ae-Ac)/Ae\} \times 100$ (%), wherein Ae represents an area of a plane of each of the air electrode and the fuel electrode, and Ac represents a sum of areas of the catalyst particles exposed on the plane of each of the air electrode and the fuel electrode.

Figure 17:
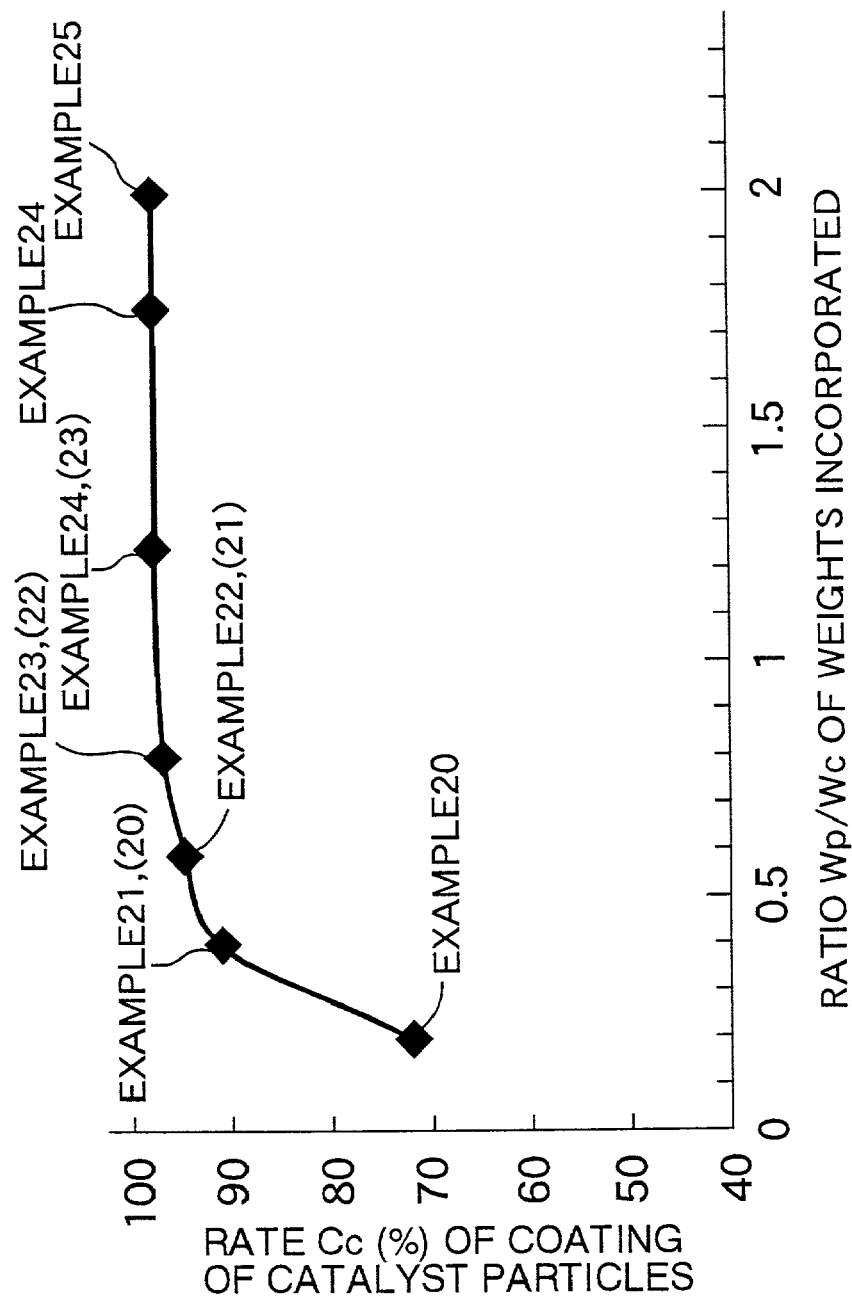
FIG. 17 is a graph showing a third example of the relationship between the ratio Wp/Wc of weights incorporated and the rate Cc of coating of catalyst particles.

FIG. 17 is a graph made based on Table 18 and showing the relationship between the ratio Wp/Wc of the weights incorporated and the rate Cc of coating of the catalyst particles. It can be seen from FIG. 17 that the rate Cc of coating of the catalyst particles is increased with an increase in ratio Wp/Wc.

Table 19 shows the relationship between the ratio Wp/Wc of the weights incorporated and the degree D of dispersion of the catalyst particles for the examples 20 to 25 of the fuel electrodes 4 and the examples 20 to 24 of the air electrodes 3.

TABLE 19

| Fuel electrode | Air electrode | Ratio Wp/Wc of weights incorporated | Degree D (%) of dispersion of catalyst particles |
|---|---|---|---|
| Example 20 | — | 0.2 | 2 |
| Example 21 | Example 20 | 0.4 | 3 |
| Example 22 | Example 21 | 0.6 | 5 |
| Example 23 | Example 22 | 0.8 | 7 |
| Example 24 | Example 23 | 1.25 | 8 |
| — | Example 24 | 1.75 | 9 |
| Example 25 | — | 2.0 | 9 |

The degree D of dispersion of the catalyst particles was determined likewise in the following manner. First, a theoretical concentration Tp of platinum (Pt) in the catalyst particles and a theoretic concentration Ts of sulfur (S) in the sulfonated PEEK were calculated from the amounts of sulfonated PEEK and catalyst particles incorporated at the time of the manufacture of the air electrode 3 (or the fuel electrode 4), and a theoretical ratio Ts/Tp was then determined from such theoretical values Tp and Ts. The surface of each of the air electrode 3 and the fuel electrode 4 was observed by EPMA, and an actual concentration Ap of Pt in the catalyst particles and an actual concentration of S in the sulfonated PEEK were determined by a surface analysis, and an actual ratio As/Ap was determined from such actual values As and Ap.

Thereafter, a degree D of dispersion of the catalyst particles was determined according to the following equation:

$D = [\{(Ts/Tp) - (As/Ap)\}/(Ts/Tp)] \times 100$ (%)

Figure 18:
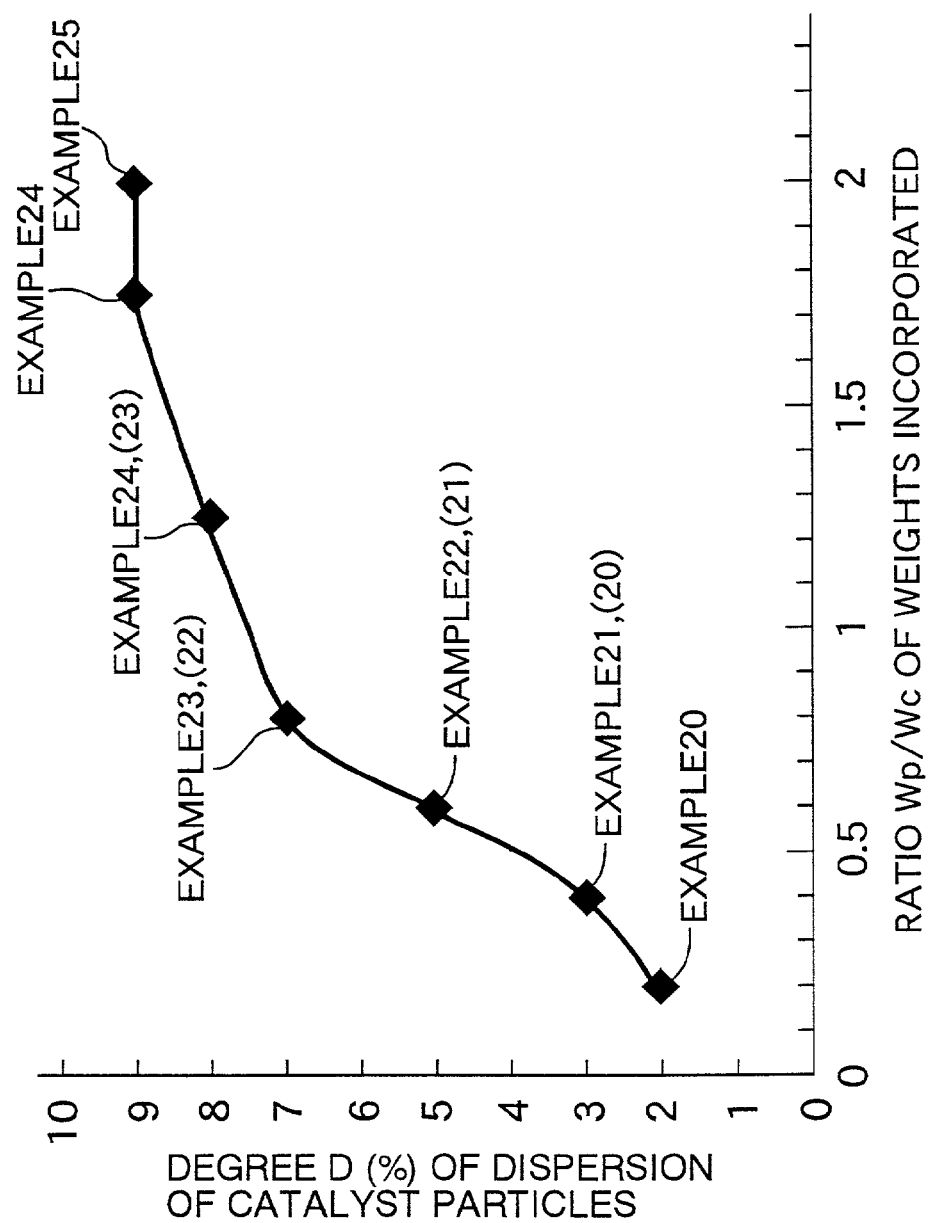
FIG. 18 is a graph showing a third example of the relationship between the ratio Wp/Wc of weights incorporated and the degree D of dispersion of the catalyst particles.

FIG. 18 is a graph made based on Table 19 and showing the relationship between the ratio Wp/Wc of the weights incorporated and the degree D of dispersion of the catalyst particles. It can be seen from FIG. 18 that the degree D of dispersion of the catalyst particles is increased with an increase in ratio Wp/Wc.

Table 20 shows the relationship between the degree D of dispersion of the catalyst particles and the thickness of each of the air electrode 3 and the fuel electrode 4 for the examples 20 to 25 of the fuel electrodes 4 and the examples 20 to 24 of the air electrodes 3.

TABLE 20

| Fuel electrode | Air electrode | Degree D (%) of dispersion of catalyst particles | Thickness (μm) of of air electrode and fuel electrode |
|---|---|---|---|
| Example 20 | — | 2 | 3 |
| Example 21 | Example 20 | 3 | 5 |
| Example 22 | Example 21 | 5 | 6 |
| Example 23 | Example 22 | 7 | 7 |
| Example 24 | Example 23 | 8 | 8 |
| Example 25 | Example 24 | 9 | 9 |

Figure 19:
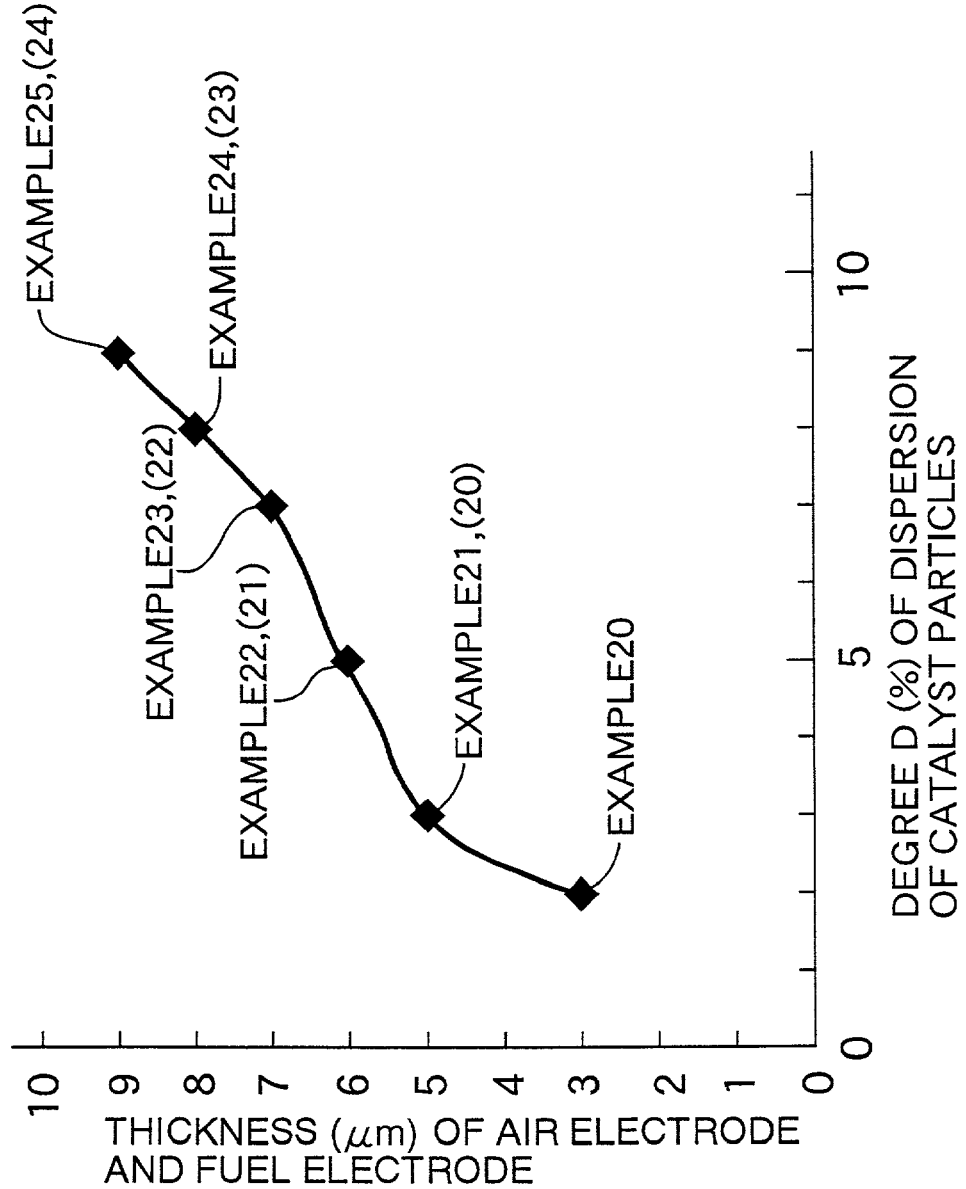
FIG. 19 is a graph showing a third example of the relationship between the degree D of dispersion of the catalyst particles and the thickness of each of the air and fuel electrodes.

FIG. 19 is a graph made based on Table 20 and showing the relationship between the degree D of dispersion of the catalyst particles and the thickness of each of the air electrode and the fuel electrode. It can be seen from FIG. 19 that the thickness of each of the air electrode and the fuel electrode is increased with an increase in degree D of dispersion of the catalyst particles.

III. Power-generating Performance of Fuel Cell

An electrolyte membrane 2 having a thickness of 50 μm was formed using a sulfonated PEEK similar to that used in the production of each of the fuel electrode 4 and the air electrode 3. The examples (20) to (25) of the fuel electrode 4 and the examples (20) to (24) of the air electrode 3 were prepared and combined, so that each of the examples (20) to (25) of the fuel electrodes 4 was paired with the every examples (20) to (24) of the air electrodes 3. More specifically, as regards the example (20), the following combinations were made: a combination of the example (20) and the example (20); a combination of the example (20) and the example (21); . . . a combination of the example (20) and the example (24). In this manner, 30 sets of electrode pairs were compared. The electrolyte membrane 2 was sandwiched between each pair of electrodes, namely, each set of the air electrode 3 and the fuel electrode 4, and subjected to a hot pressing under conditions of 140° C., 1.5 MPa and one minute to produce a membrane electrode assembly 9. A solid polymer fuel cell 1 was assembled using each of the membrane electrode assemblies 9 and used to generate a power under a condition that the moistening was carried out from the side of the fuel electrode 4, and the relationship between the current density and the terminal voltage was measured. In this case, because a large influence was exerted to the terminal voltage due to the diffusion of water, a terminal voltage at a high current density of 0.8 A/cm$^2$ was likewise used as a comparative value of terminal voltage of each cell.

Table 21 shows the ratio Wp/Wc of the incorporated weights, the combination of the air electrode and the fuel electrode in each cell and the terminal voltage at 0.8 A/cm$^2$ for the examples (20) to (25) of the fuel electrodes 4 and the examples (20) to (24) of the air electrodes 3.

TABLE 21

|  |  |  | Fuel electrode | | | | | |
|---|---|---|---|---|---|---|---|---|
|  |  | Ratio Wp/Wc | Ex. 20 0.2 | Ex. 21 0.4 | Ex. 22 0.6 | Ex. 23 0.8 | Ex. 24 1.25 | Ex. 25 2.0 |
| Air electrode | Ex. 20 | 0.4 | 0.638 | 0.612 | 0.608 | 0.603 | 0.602 | 0.577 |
|  | Ex. 21 | 0.6 | 0.658 | 0.682 | 0.674 | 0.658 | 0.614 | 0.597 |
|  | Ex. 22 | 0.8 | 0.664 | 0.674 | 0.691 | 0.672 | 0.621 | 0.613 |
|  | Ex. 23 | 1.25 | 0.658 | 0.668 | 0.689 | 0.686 | 0.638 | 0.622 |
|  | Ex. 24 | 1.75 | 0.648 | 0.642 | 0.647 | 0.649 | 0.642 | 0.637 |
|  |  |  | Terminal voltage (V) | | | | | |

Ex. = Example

Figure 20:
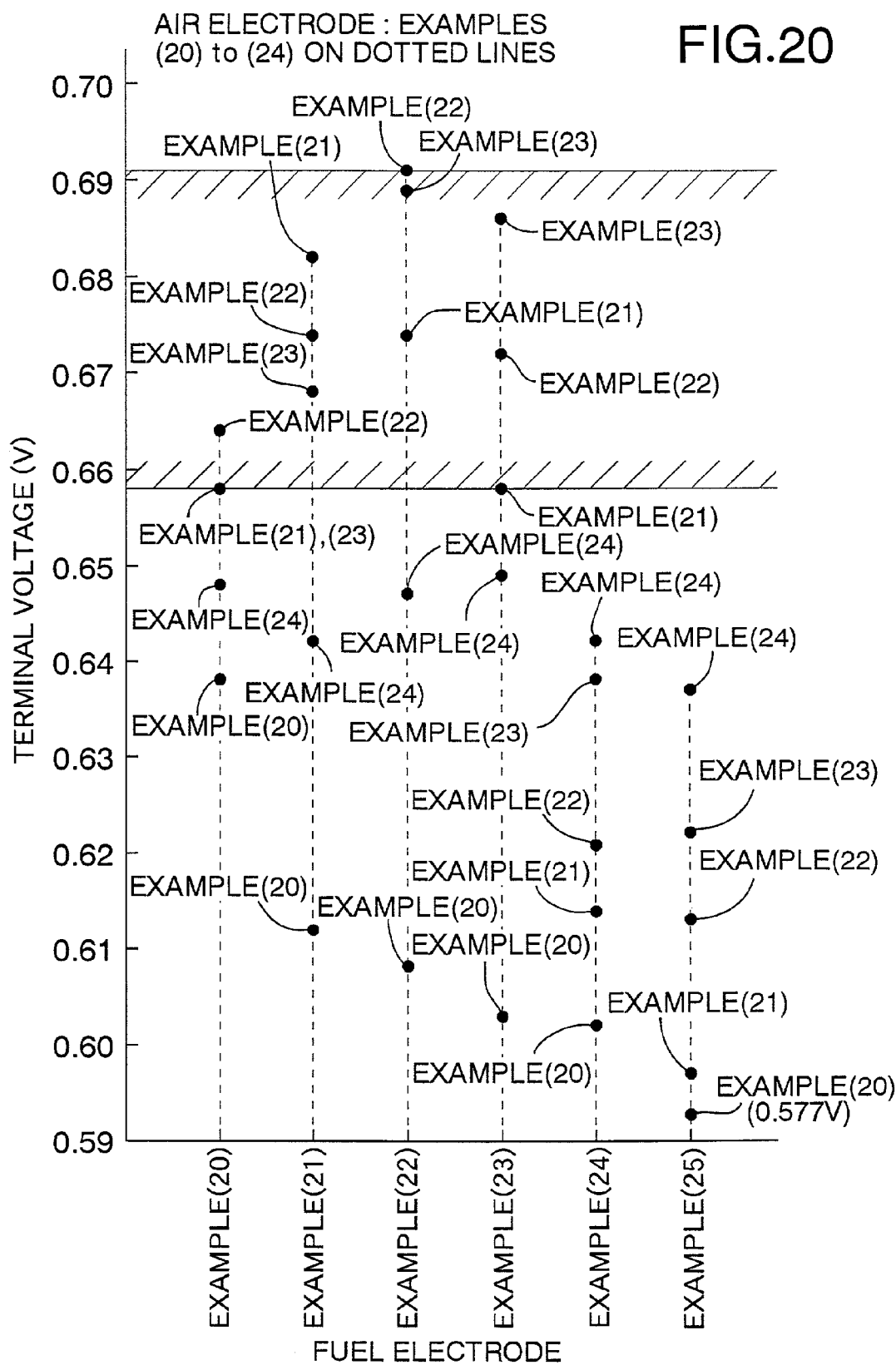
FIG. 20 is a graph showing a third example of the relationship between the combinations of air electrodes and fuel electrodes and the terminal voltage.
Figure 21:
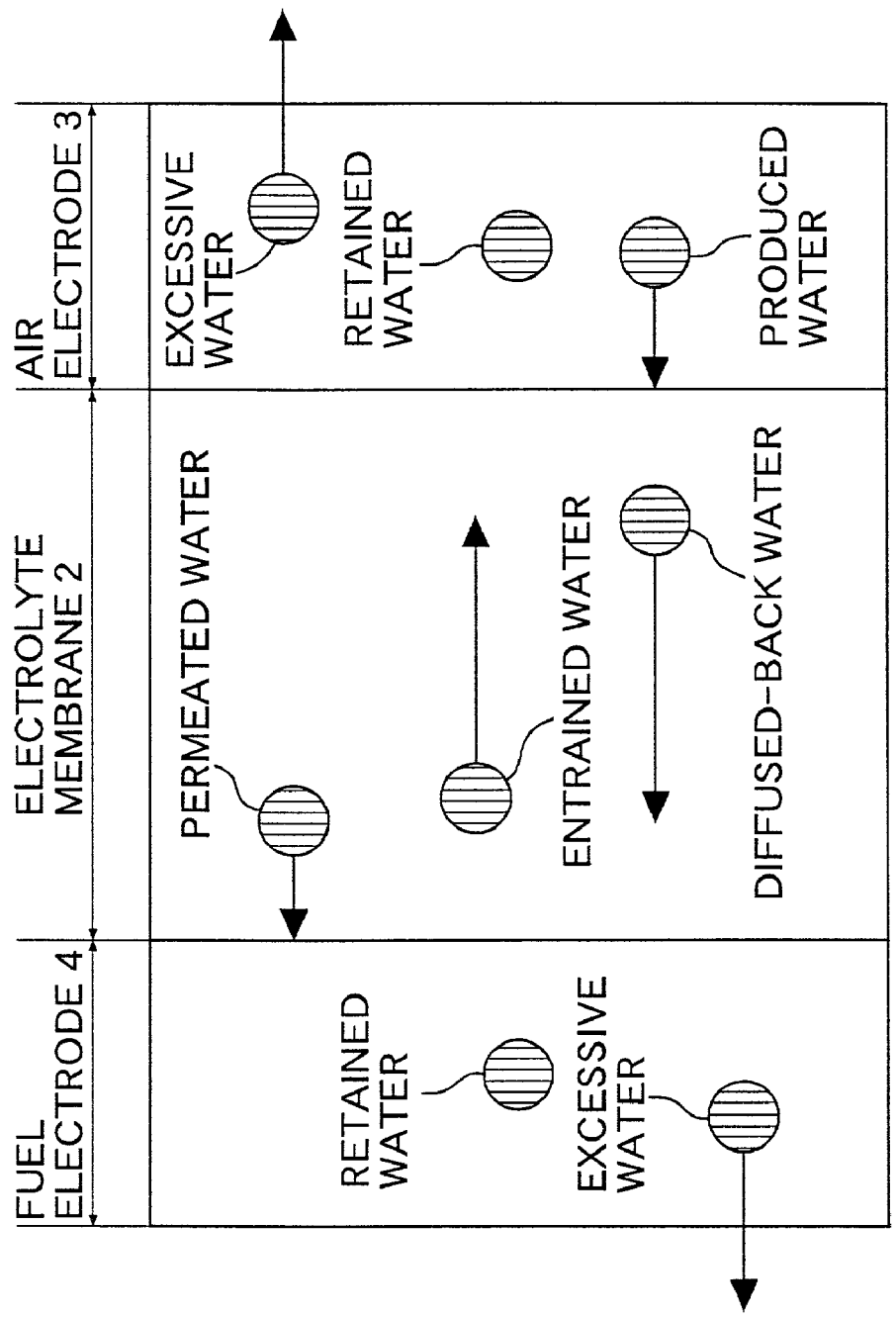
FIG. 21 is a diagram showing a state of water distributed in each of the electrolyte membrane and the air and fuel electrodes.

FIG. 20 is a graph made based on Table 21 and showing the relationship between the combination of the air and fuel electrodes 3 and 4 and the terminal voltage. As apparent from Table 21 and FIG. 20, if the combinations are made between the examples (20) to (23) of the fuel electrodes 4 and the examples (21) to (23) of the air electrodes 3, the power-generating performance of each of the solid polymer fuel cells 1 can be enhanced, when the solid polymer fuel cell was operated under a condition that the moistening was carried out from only the side of the fuel electrode 4.

For comparison, solid polymer fuel cells 1 assembled using the combination of the example 22 of the fuel electrode 4 and the example 22 of the air electrode 3 was used to generate a power under conditions that the moistening was carried out from only the side of the air electrode 3, and the relationship between the current density and the terminal voltage was measured. As a result, it was ascertained that the terminal voltage at a current density of 0.8 A/cm$^2$ was 0.613 V. It is obvious that this terminal voltage is about 11% lower than the terminal voltage of 0.691 V in a case of the combination of the example (22) of the fuel electrode and the example (22) of the air electrode shown in Table 21.

From this fact, it is clear that moistening can be carried out from only the side of the fuel electrode 4 in each of the fuel cells 1 made using the combinations of the examples (20) to (23) of the fuel electrodes 4 and the examples (21) to (23) of the air electrodes 3.

If the ratio Wp/Wc of the incorporated weights is set in the above-described range in each of the air electrode 3 and the fuel electrode 4, the thickness t of the fuel electrode 4 is in a range of 3 µm≦t≦7 µm from Table 17, as in the examples (20) to (23), and the thickness t of the air electrode 3 is in a range of 6 µm≦t≦8 µm from Table 17, as in the examples (21) to (23). In addition, the rate Cc of coating of the catalyst particles in the fuel electrode 4 is in a range of 72%≦Cc≦97% from Table 18, as in the examples (20) to (23), and the rate Cc of coating of the catalyst particles in the air electrode 3 is in a range of 95%≦Cc≦98% from Table 18, as in the examples (21) to (23). Further, the degree D of dispersion of the catalyst particles in the fuel electrode 4 is in a range of 2%≦D≦7% from Table 19, as in the examples (20) to (23), and the degree D of dispersion of the catalyst particles in the air electrode 3 is in a range of 5%≦D≦8% from Table 13, as in the examples (21) to (23).

A solid polymer fuel cell 1 other embodiments of this invention can have a structure similar to that shown in FIG. 1, but can be operated in a non-moistened state (without a moistener).

An electrolyte membrane 2 can be formed of a polymer ion-exchange component having a proton conductivity, e.g., an aromatic hydrocarbon polymer ion-exchange component in the embodiment. Each of an air electrode 3 and a fuel electrode 4 can be formed of a plurality of catalyst particles including Pt particles as catalyst metal particles carried on surfaces of carbon black particles, and a polymer ion-exchange component which can have a proton conductivity and a function as a binder and which can be the same as or different from the above-described polymer ion-exchange component, e.g., an aromatic hydrocarbon polymer ion-exchange component in the embodiment. In this case, PTFE particles are not required and are preferably not included as a third component.

Each of diffusion layers 5 and 6 can be formed of a porous carbon paper, a carbon plate or the like, and separators 7 and 8 can be formed of graphitized carbon to have the same shape. Air can be supplied to a plurality of grooves 10 provided in the separator 7 located adjacent the air electrode 3, and hydrogen can be supplied to a plurality of grooves 11 provided in the separator 8 adjacent the fuel electrode 4 in an intersecting relation to the grooves 10.

The aromatic hydrocarbon polymer ion-exchange component can have such a nature that it is free of fluorine and soluble in a solvent. Examples of such polymer ion-exchange components which may be used are the various sulfonated aromatic hydrocarbon polymers shown in the above-described Table 1. Examples of solvents which may be used are polar solvents shown in the above-described Table 2.

The carbon black particles used in each of the air electrode 3 and the fuel electrode 4 can have such a hydrophilic property that an amount of steam adsorbed, i.e., an amount A of water adsorbed under a saturated steam pressure at 60° C. was equal to or larger than 150 cc/g.

If the carbon black particles have the hydrophilic property, the production of water, the retaining of the produced water and the diffusion of the produced water back to the electrolyte membrane 2 occur in the air electrode 3. The water diffused back to the electrolyte membrane 2 is used as water entrained with the migration of protons within the electrolyte membrane 2 and additionally, is permeated into and retained in the fuel electrode 4. Because the air electrode 3 and the fuel electrode 4 always retain the water therein in the above manner, a wet state of the electrolyte membrane 2 is ensured, and the diffusion-back of the produced water and the entraining of protons are repeatedly performed within the membrane 2. Therefore, the conduction of protons is ensured without moistening. An excessive amount of water in each of the air electrode 3 and the fuel electrode 4 is discharged to the outside.

If the weight of polymer ion-exchange component incorporated in each of the air electrode 3 and the fuel electrode 4 is represented by Wp, and the weight of carbon black particles incorporated in each of the air electrode 3 and the fuel electrode 4 is represented by Wc, the ratio Wp/Wc between the weights Wp and Wc is set in a range of $0.4 \leq Wp/Wc \leq 1.25$.

If the ratio Wp/Wc between the weights Wp and Wc is set in such range, the thickness of each of the air electrode 3 and the fuel electrode 4 can be reduced to enhance the proton conductivity, and the increase in resistance over-voltage can be inhibited to enhance the power-generating performance.

Particular examples will be described below.

I. Production of Electrode

Platinum (Pt) particles were carried on carbon black particles (under a trade name of Vulcan XC-72) having such a hydrophilic property that an amount A of water adsorbed under a saturated steam pressure at 60° C. was equal to 370 cc/g, thereby preparing catalyst particles. The content of the Pt particles in the catalyst particles was 50% by weight.

EXAMPLE I

The sulfonated PEEK shown as Example 1 in Table 1 was prepared as the aromatic hydrocarbon polymer ion-exchange component and dissolved in NMP shown in Table 2 under reflux. The content of the sulfonated PEEK in the solution was 6% by weight. The catalyst particles were mixed into the sulfonated PEEK-containing solution, so that the ratio Wp/Wc of the weight Wp of sulfonated PEEK incorporated to the weight Wc of carbon black particles incorporated was equal to 0.2. Then, the catalyst particles were dispersed in the sulfonated PEEK-containing solution using a ball mill to prepare a slurry for an electrode. The slurry was applied onto one surface of each of a plurality of porous carbon papers, so that the content of Pt was 0.5 mg/cm². The slurry on each of the papers was then dried to provide an electrode having a diffusion layer. These electrodes are referred to as example (30).

EXAMPLE II

A process similar to that in EXAMPLE I was carried out except that the ratio Wp/Wc of weight Wp of sulfonated PEEK incorporated to the weight Wc of carbon black particles incorporated was set at 0.4, thereby producing a plurality of electrodes each having a diffusion layer. These electrodes are referred to as example (31).

EXAMPLE III

A process similar to that in EXAMPLE I was carried out except that the ratio Wp/Wc of weight Wp of sulfonated PEEK incorporated to the weight Wc of carbon black particles incorporated was set at 0.6, thereby producing a plurality of electrodes each having a diffusion layer. These electrodes are referred to as example (32).

EXAMPLE IV

A process similar to that in EXAMPLE I was carried out except that the ratio Wp/Wc of weight Wp of sulfonated PEEK incorporated to the weight Wc of carbon black particles incorporated was set at 0.8, thereby producing a plurality of electrodes each having a diffusion layer. These electrodes are referred to as example (33).

EXAMPLE V

A process similar to that in EXAMPLE I was carried out except that the ratio Wp/Wc of weight Wp of sulfonated PEEK incorporated to the weight Wc of carbon black particles incorporated was set at 1.25, thereby producing a plurality of electrodes each having a diffusion layer. These electrodes are referred to as example (34).

EXAMPLE VI

A process similar to that in EXAMPLE I was carried out except that the ratio Wp/Wc of weight Wp of sulfonated PEEK incorporated to the weight Wc of carbon black particles incorporated was set at 1.75, thereby producing a plurality of electrodes each having a diffusion layer. These electrodes are referred to as example (35).

II. Considerations Pertaining to Electrodes

Table 22 shows the relationship between the ratio Wp/Wc of weight Wp of sulfonated PEEK incorporated to the weight Wc of carbon black particles incorporated and the water-retention of the electrode for the electrode examples (30) to (35). The water retention was calculated likewise from the amount of water adsorbed under the saturated steam pressure at 60° C. by a gas adsorption device.

TABLE 22

| Electrode | Ratio Wp/Wc of weights | Water retention (%) of electrode |
| --- | --- | --- |
| Example (30) | 0.2 | 54 |
| Example (31) | 0.4 | 58 |
| Example (32) | 0.6 | 63 |
| Example (33) | 0.8 | 65 |
| Example (34) | 1.25 | 68 |
| Example (35) | 1.75 | 72 |

Figure 22:
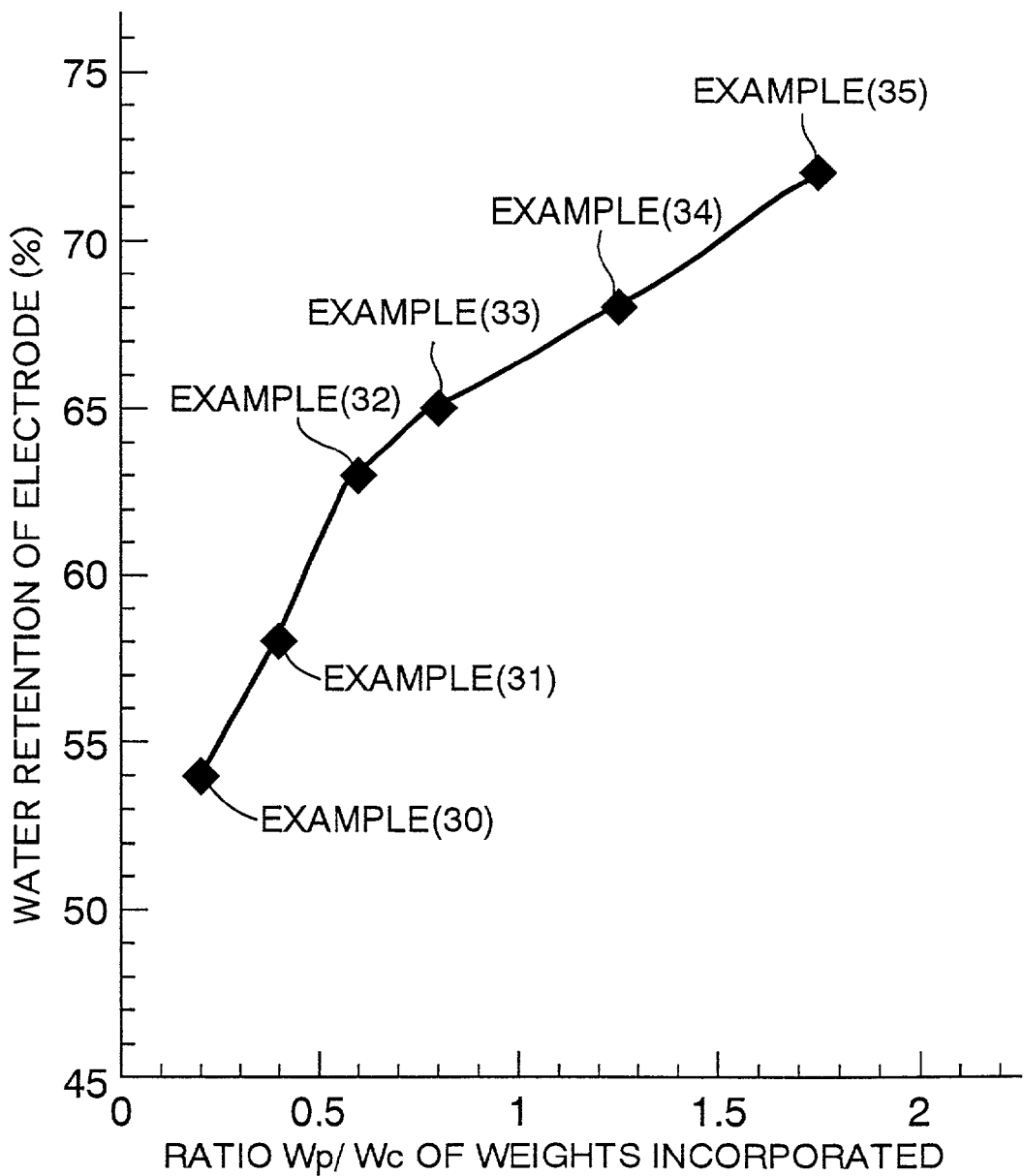
FIG. 22 is a graph showing a fourth example of the relationship between the ratio Wp/Wc of weights incorporated and the water retention of each of electrodes.

FIG. 22 is a graph made based on Table 22 and showing the relationship between the ratio Wp/Wc of the weights and the water retention of the electrode. It can be seen from FIG. 22 that the water retention of the electrode is increased with an increase in ratio Wp/Wc.

Table 23 shows the relationship between the ratio Wp/Wc of the weights and the thickness of the electrode for the electrode examples (30) to (35).

TABLE 23

| Electrode | Ratio Wp/Wc of weights | Thickness (μm) of electrode |
| --- | --- | --- |
| Example (30) | 0.2 | 3 |
| Example (31) | 0.4 | 5 |
| Example (32) | 0.6 | 6 |
| Example (33) | 0.8 | 7 |
| Example (34) | 1.25 | 8 |
| Example (35) | 1.75 | 9 |

Figure 23:
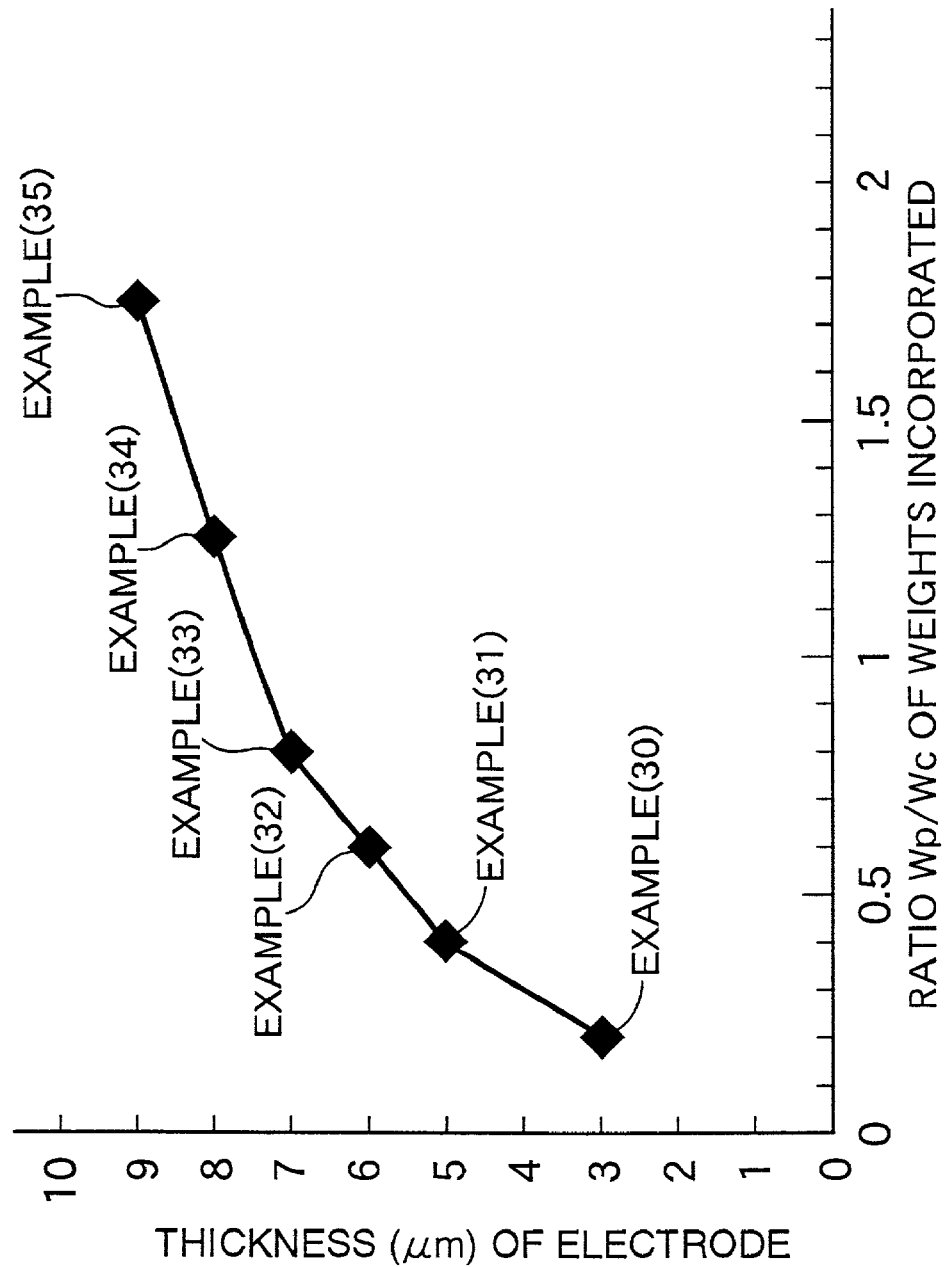
FIG. 23 is a graph showing a fourth example of the relationship between the ratio Wp/Wc of weights incorporated and the thickness of each of the electrodes.

FIG. 23 is a graph made based on Table 23 and showing the relationship between the ratio Wp/Wc of the weights and the thickness of the electrode. It can be seen from FIG. 23 that the thickness of the electrode is increased with an increase in the ratio Wp/Wc.

Table 24 shows the relationship between the ratio Wp/Wc of the weights and the rate Cc of coating of the catalyst particles for the electrode examples (30) to (35).

TABLE 24

| Electrode | Ratio Wp/Wc of weights | Rate Cc (%) of coating of catalyst particles |
|---|---|---|
| Example (30) | 0.2 | 72 |
| Example (31) | 0.4 | 91 |
| Example (32) | 0.6 | 95 |
| Example (33) | 0.8 | 97 |
| Example (34) | 1.25 | 98 |
| Example (35) | 1.75 | 98 |

The ratio Cc of coating of the catalyst particles was determined likewise according to Cc={(Ae−Ac)/Ae}×100 (%), wherein Ae represents an area of a plane of the electrode, and Ac represents a sum of areas of the catalyst particles exposed on the plane of the electrode.

Figure 24:
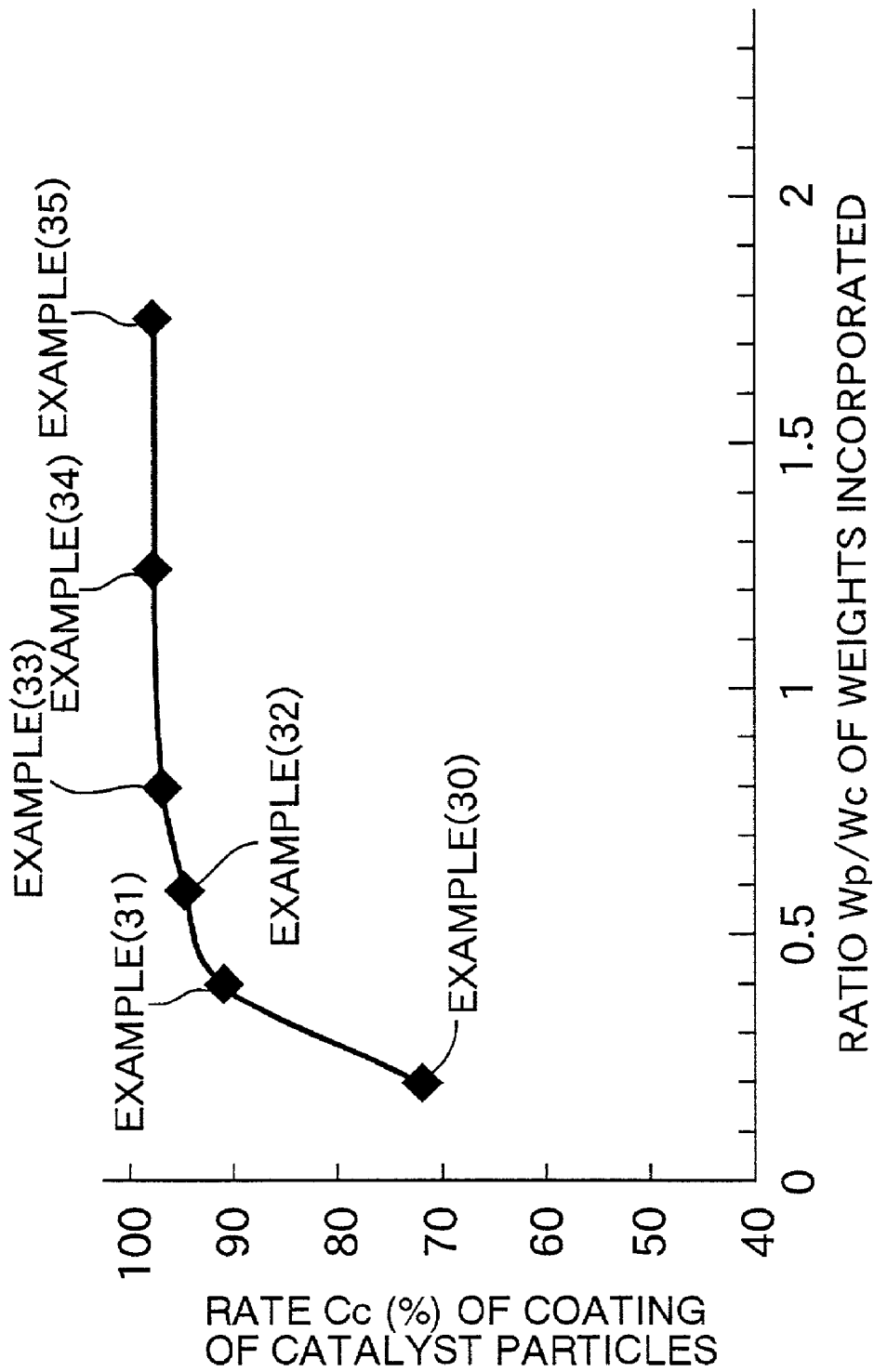
FIG. 24 is a graph showing a fourth example of the relationship between the ratio Wp/Wc of weights incorporated and the rate Cc of coating of catalyst particles.

FIG. 24 is a graph made based on Table 24 and showing relationship between the ratio Wp/Wc of the weights and the rate Cc of coating of the catalyst particles. It can be seen from FIG. 24 that the rate Cc of coating of the catalyst particles is increased with an increase in ratio Wp/Wc.

Table 25 shows the relationship between the ratio Wp/Wc of the weights and the degree D of dispersion of catalyst particles for the electrode examples (30) to (35).

TABLE 25

| Electrode | Ratio Wp/Wc of weights | Degree D (%) of dispersion of catalyst particles |
|---|---|---|
| Example (30) | 0.2 | 2 |
| Example (31) | 0.4 | 3 |
| Example (32) | 0.6 | 5 |
| Example (33) | 0.8 | 7 |
| Example (34) | 1.25 | 8 |
| Example (35) | 1.75 | 9 |

The degree D of dispersion of the catalyst particles was determined in the following manner: First, a theoretic concentration Tp of platinum (Pt) in the catalyst particles and a theoretic concentration Ts of sulfur (S) in the sulfonated PEEK were calculated from the amounts of catalyst particles and sulfonated PEEK incorporated at the time of the manufacture of the electrode, and a theoretic ratio Ts/Tp was then determined from such theoretic values Tp and Ts. The surface of the electrode was observed by EPMA, and an actual concentration Ap of Pt in the catalyst particles and an actual concentration of S in the sulfonated PEEK were determined by a surface analysis, and an actual ratio As/Ap was determined from such actual values As and Ap.

Thereafter, a degree D of dispersion of the catalyst particles was determined according to the following equation:

$$D=[\{(Ts/Tp)-(As/Ap)\}/(Ts/Tp)]\times 100 \ (\%)$$

Figure 25:
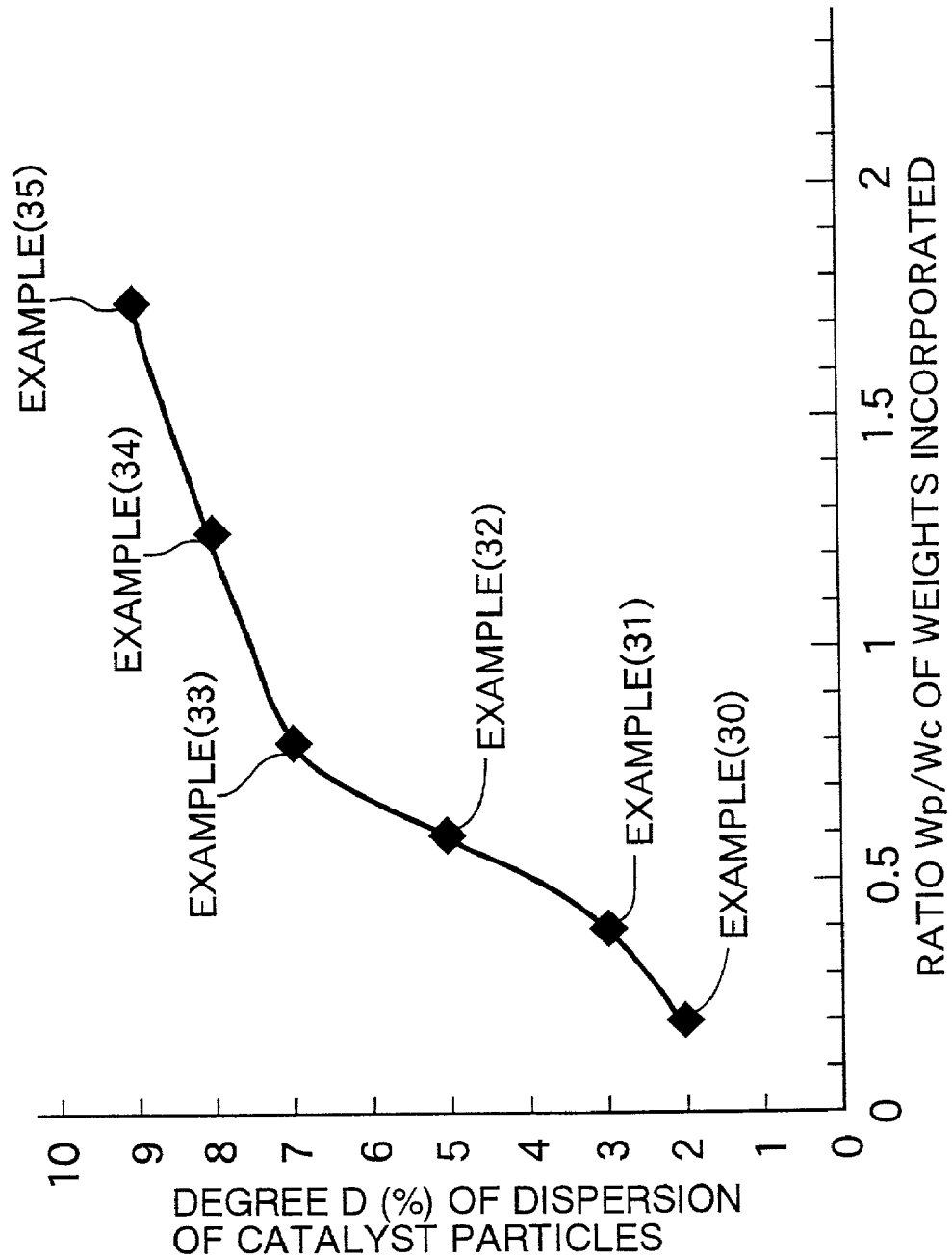
FIG. 25 is a graph showing a fourth example of the relationship between the ratio Wp/Wc of weights incorporated and the degree D of dispersion of the catalyst particles.

FIG. 25 is a graph made based on Table 25 and showing the relationship between the ratio Wp/Wc of the incorporated weights and the degree D of dispersion of the catalyst particles. It can be seen from FIG. 25 that the degree D of dispersion of the catalyst particles is increased with an increase in ratio Wp/Wc.

Table 26 shows the relationship between the degree D of dispersion of the catalyst particles and the thickness of the electrode for the electrode examples (30) to (35).

TABLE 26

| Electrode | Degree D (%) of dispersion of catalyst particles | Thickness (μm) of electrode |
|---|---|---|
| Example (30) | 2 | 3 |
| Example (31) | 3 | 5 |
| Example (32) | 5 | 6 |
| Example (33) | 7 | 7 |
| Example (34) | 8 | 8 |
| Example (35) | 9 | 9 |

Figure 26:
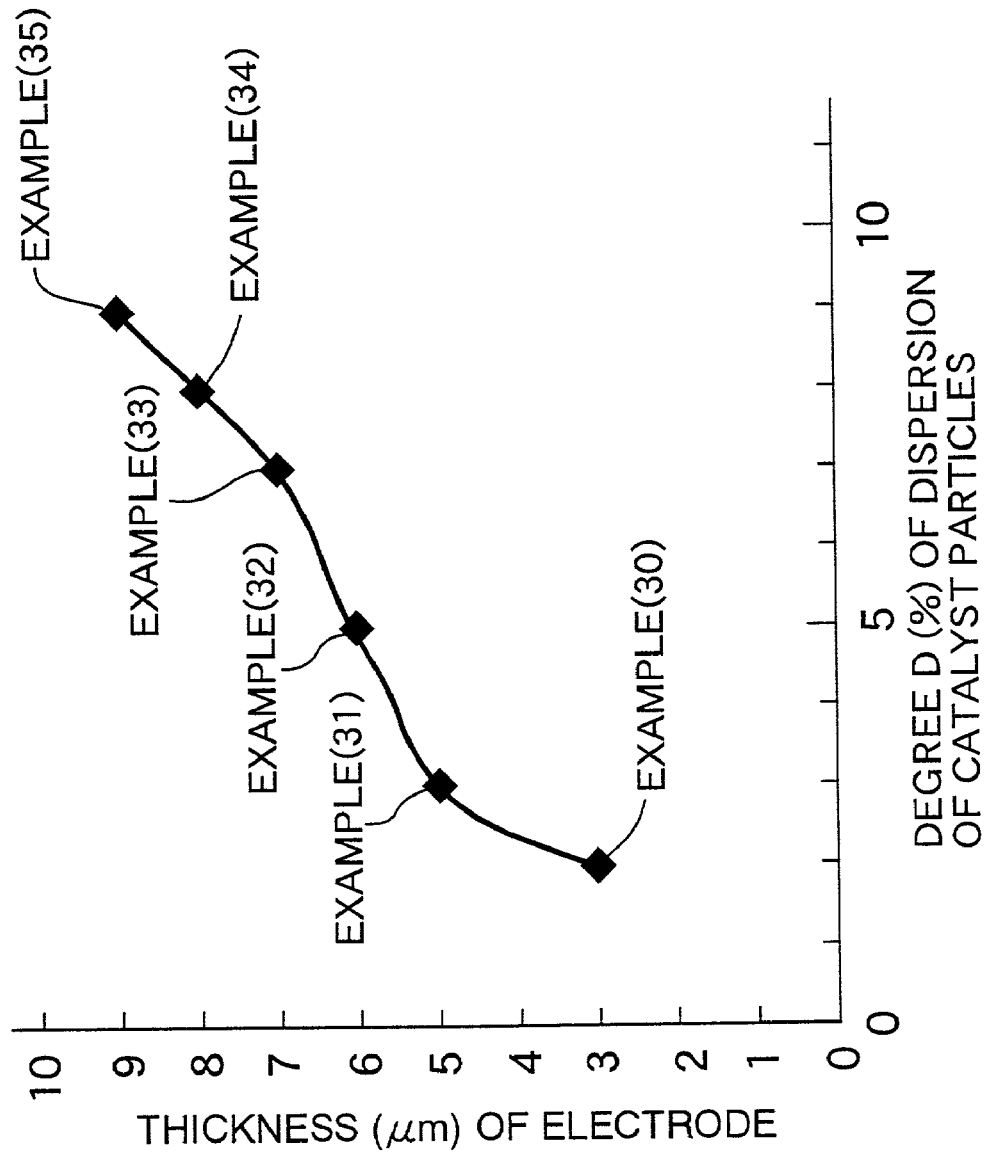
FIG. 26 is a graph showing a fourth example of the relationship between the degree D of dispersion of the catalyst particles and the thickness of each of the electrodes.

FIG. 26 is a graph made based on Table 26 and showing the relationship between the degree D of dispersion of the catalyst particles and the thickness of the electrode. It can be seen from FIG. 26 that the thickness of the electrode is increased with an increase in degree D of dispersion of the catalyst particles.

III. Power-generating Performance of Fuel Cell

An electrolyte membrane 2 having a thickness of 50 μm was formed using a sulfonated PEEK similar to that used in the production of the electrode. Two sets of the electrode examples (30) to (35) were prepared, and one of the sets was defined as examples (30) to (35) of the air electrodes 3, and the other set was defined as examples (30) to (35) of the fuel electrodes 4. The examples (30) to (35) of the air electrodes 3 and the examples (30) to (35) of the fuel electrodes 4 were combined, so that each of the examples (30) to (35) of the air electrodes 3 was paired with the examples (30) to (35) of the fuel electrodes 4. More specifically, as regards the example (1), the following combinations were made: a combination of the example (30) and the example (30), a combination of the example (30) and the example (31); . . . a combination of the example (30) and the example (34) and a combination of the example (30) and the example (35). In this manner, 36 sets of electrode pairs were compared. The electrolyte membrane 2 was sandwiched between each pair of electrodes, namely, each set of the air electrode 3 and the fuel electrode 4, and subjected to a hot pressing under conditions of 140° C., 1.5 MPa and one minute to produce a membrane electrode assembly 9. A solid polymer fuel cell 1 was assembled using each of the membrane electrode assemblies 9 and used to generate a power without moistening, and the relationship between the current density and the terminal voltage was measured. In this case, because a large influence was exerted to the terminal voltage due to the diffusion of water, a terminal voltage at a high current density of 0.8 A/cm² was used as a comparative value of terminal voltage of each cell.

Table 27 shows the ratio Wp/Wc of the incorporated weights, the combination of the air electrode and the fuel electrode in each cell and the terminal voltage at 0.8 A/cm² for the examples (30) to (35) of the air and fuel electrodes.

TABLE 27

| | | | Air electrode | | | | | |
|---|---|---|---|---|---|---|---|---|
| | | Ratio Wp/Wc | Ex. 30 0.2 | Ex. 31 0.4 | Ex. 32 0.6 | Ex. 33 0.8 | Ex. 34 1.25 | Ex. 35 2.0 |
| Fuel electrode | Ex. 30 | 0.2 | 0.648 | 0.612 | 0.608 | 0.603 | 0.602 | 0.577 |
| | Ex. 31 | 0.4 | 0.642 | 0.688 | 0.682 | 0.678 | 0.672 | 0.597 |
| | Ex. 32 | 0.6 | 0.638 | 0.682 | 0.690 | 0.683 | 0.676 | 0.613 |
| | Ex. 33 | 0.8 | 0.635 | 0.678 | 0.685 | 0.689 | 0.686 | 0.622 |
| | Ex. 34 | 1.25 | 0.632 | 0.668 | 0.681 | 0.685 | 0.691 | 0.626 |
| | Ex. 35 | 1.75 | 0.631 | 0.647 | 0.648 | 0.649 | 0.642 | 0.645 |
| | | | | | Terminal voltage (V) | | | |

Ex. = Example

Figure 27:
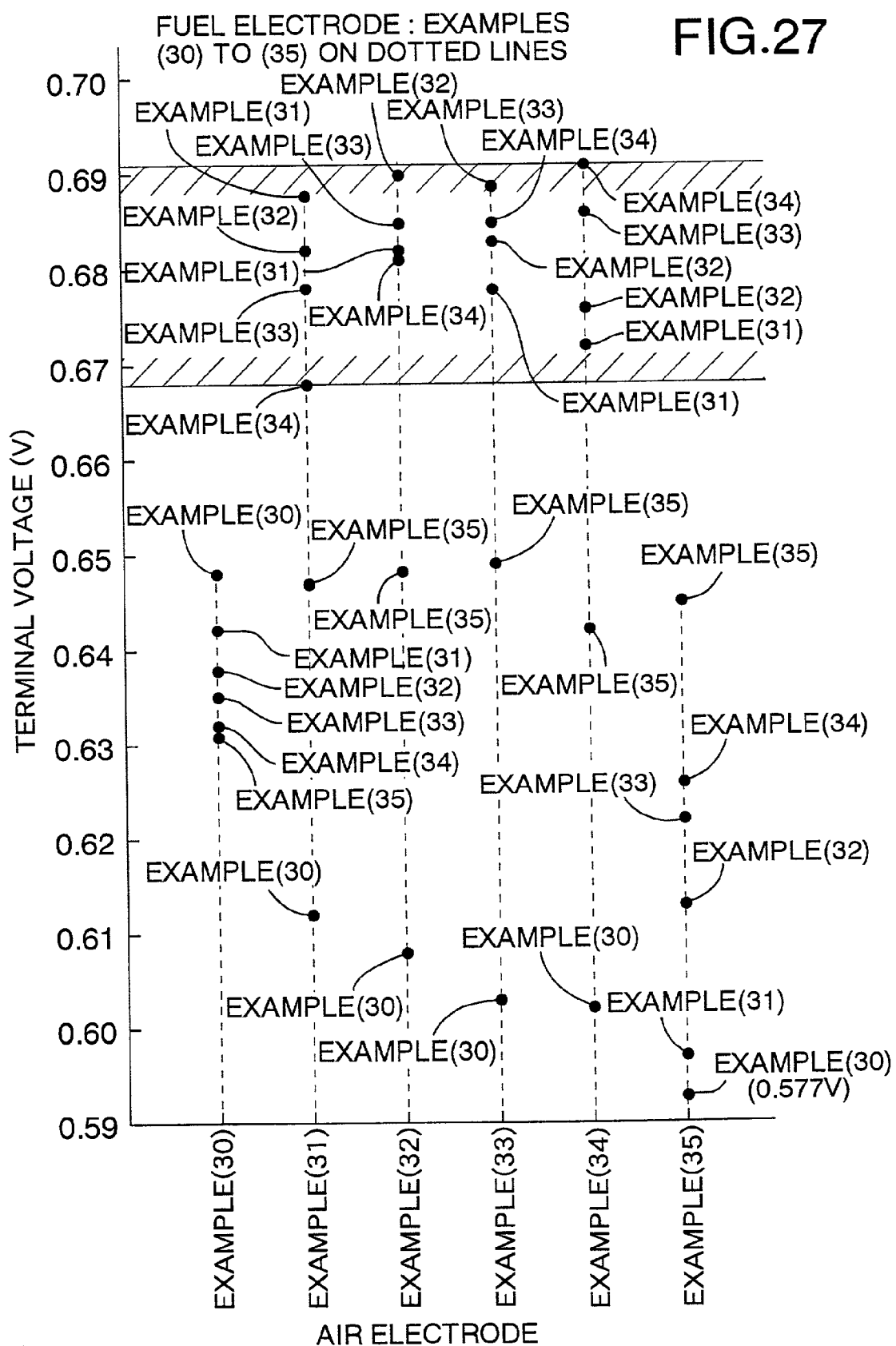
FIG. 27 is a graph showing a fourth example of the relationship between the combinations of air electrodes and fuel electrodes and the terminal voltage.

FIG. 27 is a graph made based on Table 27 and showing the relationship between the combination of the air and fuel electrodes 3 and 4 and the terminal voltage. As apparent from Table 27 and FIG. 27, if the combinations are made between the examples (31) to (34) of the air electrodes and the examples (31) to (34) of the fuel electrodes, the power-generating performance of each of the solid polymer fuel cells can be enhanced, when the solid polymer fuel cell was operated in a non-moistened state.

For comparison, two examples (36) of electrodes each including a diffusion layer and having a ratio Wp/Wc of weights equal to 0.6 were produced in a manner similar to that in the above-described EXAMPLE-III using catalyst particles similar to those described above, except for the use of carbon black particles (under a trade name of Vulcan XC-72) having a water-repellent property such that an amount of water adsorbed under a saturated steam pressure at 60° C. was equal to 72 cc/g.

The two examples (36) were used as an air electrode 3 and a fuel electrode 4 to produce an electrolyte membrane/electrode assembly 9. A solid polymer fuel cell 1 was assembled using the electrolyte membrane/electrode assembly 9 and used to generate a power without moistening, and the relationship between the current density and the terminal voltage was measured. As a result, it was ascertained that the terminal voltage at a current density of 0.8 A/cm$^2$ was 0.605 V. It is clear that this terminal voltage is about 12% lower than the terminal voltage of 0.690 V in a case of the combination of the example (32) and the example (32) shown in Table 27.

From this fact, it is clear that the carbon black particles have such a hydrophilic property that an amount of water adsorbed under a saturated steam pressure at 60° was equal to or larger than 150 cc/g, and the ratio Wp/Wc of the incorporated weights Wp and Wc is required to be in a range of $0.4 \leq Wp/Wc \leq 1.25$.

If the ratio Wp/Wc of the incorporated weights is set in such range, the thickness t of the electrode is in a range of $5\ \mu m \leq t \leq 8\ \mu m$ from Table 23; the rate Cc of coating of the catalyst particles is in a range of $91\% \leq Cc \leq 98\%$ from Table 24 and further, the degree D of dispersion of the catalyst particles is in a range of $3\% \leq D \leq 8\%$ from Table 25.

Although the embodiments of the present invention have been described in detail, it will be understood that the present invention is not limited to the above-described embodiments, and various modifications may be made without departing from the spirit and scope of the invention defined in claims.

What is claimed is:

1. A solid polymer fuel cell comprising an electrolyte membrane having an aromatic hydrocarbon polymer ion-exchange component, and an air electrode and a fuel electrode between which said electrolyte membrane is sandwiched, each of said air electrode and said fuel electrode being formed of a plurality of catalyst particles including a catalyst metal carried on surfaces of carbon black particles, and an aromatic hydrocarbon polymer ion-exchange component which is the same as or different from the aromatic hydrocarbon polymer ion-exchange component of said electrolyte membrane, said fuel cell being moistened from both of the side of said air electrode and the side of said fuel electrode, wherein said carbon black particles have a water-repellent property such that an amount A of water adsorbed under a saturated steam pressure at 60° C. is equal to or smaller than 80 cc/g, and if a weight of polymer ion-exchange component incorporated is represented by Wp, and a weight of carbon black particles incorporated is represented by Wc, a ratio Wp/Wc of the weight Wp of polymer ion-exchange component incorporated to the weight Wc of carbon black particles incorporated is in a range of $0.4 \leq Wp/Wc \leq 1.25$; and wherein said polymer ion-exchange component in each of said air electrode and said fuel electrode is a sulfonated aromatic hydrocarbon polymer, and wherein a degree D of dispersion of said catalyst particles in each of said air electrode and said fuel electrode is in a range of $3\% \leq D \leq 8\%$, each of said degrees D of dispersion of said catalyst particles being determined according to $$D = (\{(Ts/Tp)-(As/Ap)\}/(Ts/Tp)) \times 100\ (\%)$$

wherein Tp represents a theoretical concentration of a catalyst metal in the catalyst particles; Ts represents a theoretical concentration of sulfur (S) in said sulfonated aromatic hydrocarbon polymer; Ap represents an actual concentration of the catalyst metal in the catalyst particles; and As represents an actual concentration of sulfur (S) in said sulfonated aromatic hydrocarbon polymer.

2. A solid polymer fuel cell comprising an electrolyte membrane having an aromatic hydrocarbon polymer ion-exchange component, and an air electrode and a fuel electrode between which said electrolyte membrane is sandwiched, each of said air electrode and said fuel electrode being formed of a plurality of catalyst particles including a catalyst metal carried on surfaces of carbon black particles, and an aromatic hydrocarbon polymer ion-exchange component which is the same as or different from the aromatic hydrocarbon polymer ion-exchange component of said electrolyte membrane, the fuel cell being moistened from only the side of said air electrode, wherein said carbon black particles in said air electrode have a water-repellent property such that an amount A of water adsorbed under a saturated steam pressure at 60° C. is equal to or smaller than 80 cc/g, and if a weight of polymer ion-exchange component incorporated in said air electrode is represented by Wp, and a weight of carbon black particles incorporated in said air electrode is represented by Wc, a ratio Wp/Wc of the weights Wp and Wc is in a range of $0.2 \leq Wp/Wc \leq 0.8$, and wherein said carbon black particles in said fuel electrode have a hydrophilic property such that an amount A of water adsorbed under a saturated steam pressure at 60° C. is equal to or larger than 150 cc/g, and if a weight of polymer ion-exchange component incorporated in said fuel electrode is represented by Wp, and a weight of carbon black particles incorporated in said fuel electrode is represented by Wc, a ratio Wp/Wc of the weights Wp and Wc is in a range of $0.6 \leq Wp/Wc \leq 1.25$; and wherein said polymer ion-exchange component in each of said air electrode and said fuel electrode is a sulfonated aromatic hydrocarbon polymer, and wherein a degree D of dispersion of said catalyst particles in said air electrode is in a range of $2\% \leq D \leq 7\%$, and a degree D of dispersion of said catalyst particles in said fuel electrode is in a range of $5\% \leq D \leq 8\%$, each of said degrees D of dispersion of said catalyst particles being determined according to $$D = (\{(Ts/Tp)-(As/Ap)\}/(Ts/Tp)) \times 100\ (\%)$$

wherein Tp represents a theoretical concentration of a catalyst metal in the catalyst particles; Ts represents a theoretical concentration of sulfur (S) in said sulfonated aromatic hydrocarbon polymer; Ap represents an actual concentration of the catalyst metal in the catalyst particles; and As represents an actual concentration of sulfur (S) in said sulfonated aromatic hydrocarbon polymer.

3. A solid polymer fuel cell comprising an electrolyte membrane having an aromatic hydrocarbon polymer ion-exchange component, and an air electrode and a fuel electrode between which said electrolyte membrane is sandwiched, each of said air electrode and said fuel electrode being formed of a plurality of catalyst particles including a catalyst metal carried on surfaces of carbon black particles, and an aromatic hydrocarbon polymer ion-exchange component which is the same as or different from the aromatic hydrocarbon polymer ion-exchange component of said electrolyte membrane, the fuel cell being moistened from only the side of said fuel electrode, wherein said carbon black particles in said fuel electrode have a water-repellent property such that an amount A of water adsorbed under a saturated steam pressure at 60° C. is equal to or smaller than 80 cc/g, and if a weight of polymer ion-exchange component incorporated in said fuel electrode is represented by Wp, and a weight of carbon black particles incorporated in said fuel electrode is represented by Wc, a ratio Wp/Wc of the weights Wp and Wc is in a range of $0.2 \leq Wp/Wc \leq 0.8$, and wherein said carbon black particles in said air electrode have a hydrophilic property such that an amount A of water adsorbed under a saturated steam pressure at 60° C. is equal to or larger than 150 cc/g, and if a weight of polymer ion-exchange component incorporated in said air electrode is represented by Wp, and a weight of carbon black particles incorporated in said air electrode is represented by Wc, ratio Wp/Wc of the weights Wp and Wc is in a range of $0.6 \leq Wp/Wc \leq 1.25$; and wherein said polymer ion-exchange component in each of said air electrode and said fuel electrode is a sulfonated aromatic hydrocarbon polymer, and wherein a degree D of dispersion of said catalyst particles in said fuel electrode is in a range of $2\% \leq D \leq 7\%$, and a degree D of dispersion of said catalyst particles in said air electrode is in a range of $5\% \leq D \leq 8\%$, each of said degrees D of dispersion of said catalyst particles being determined according to $$D=(\{(Ts/Tp)-(As/Ap)\}/(Ts/Tp))\times 100\ (\%)$$

wherein Tp represents a theoretical concentration of a catalyst metal in the catalyst particles; Ts represents a theoretical concentration of sulfur (S) in said sulfonated aromatic hydrocarbon polymer; Ap represents an actual concentration of the catalyst metal in the catalyst particles; and As represents an actual concentration of sulfur (S) in said sulfonated aromatic hydrocarbon polymer.

4. A solid polymer fuel cell comprising an electrolyte membrane having an aromatic hydrocarbon polymer ion-exchange component, and an air electrode and a fuel electrode between which said electrolyte membrane is sandwiched, each of said air electrode and said fuel electrode being formed of a plurality of catalyst particles including a catalyst metal carried on surfaces of carbon black particles, and an aromatic hydrocarbon polymer ion-exchange component which is the same as or different from the aromatic hydrocarbon polymer ion-exchange component of said electrolyte membrane, said fuel cell being operated without a moistener, wherein said carbon black particles have a hydrophilic property such that an amount A of water adsorbed under a saturated steam pressure at 60° C. is equal to or larger than 150 cc/g, and if a weight of polymer ion-exchange component incorporated is represented by Wp, and a weight of carbon black particles incorporated is represented by Wc, a ratio Wp/Wc of the weights Wp and Wc is in a range of $0.4 \leq Wp/Wc \leq 1.25$; and wherein said polymer ion-exchange component in each of said air electrode and said fuel electrode is a sulfonated aromatic hydrocarbon polymer, and wherein a degree D of dispersion of said catalyst particles in each of said air electrode and said fuel electrode is in a range of $3\% \leq D \leq 8\%$, each of said degrees D of dispersion of said catalyst particles being determined according to $$D=(\{(Ts/Tp)-(As/Ap)\}/(Ts/Tp))\times 100\ (\%)$$

wherein Tp represents a theoretical concentration of a catalyst metal in the catalyst particles; Ts represents a theoretical concentration of sulfur (S) in said sulfonated aromatic hydrocarbon polymer; Ap represents an actual concentration of the catalyst metal in the catalyst particles; and As represents an actual concentration of sulfur (S) in said sulfonated aromatic hydrocarbon polymer.

* * * * *